United States Patent [19]

Payne

[11] Patent Number: 5,076,076

[45] Date of Patent: Dec. 31, 1991

[54] DIRECT DRIVE OSCILLATING BASKET WASHING MACHINE AND CONTROL FOR A WASHING MACHINE

[75] Inventor: Thomas R. Payne, Louisville, Ky.

[73] Assignee: General Electric Company, Louisville, Ky.

[21] Appl. No.: 502,790

[22] Filed: Apr. 2, 1990

[51] Int. Cl.$^5$ ............................................. D06F 33/02
[52] U.S. Cl. .................................. 68/12.14; 68/12.16
[58] Field of Search ................... 68/12 R, 23 R, 23.7, 68/133, 174, 12.14, 12.16

[56] References Cited

U.S. PATENT DOCUMENTS

| | | | |
|---|---|---|---|
| 2,656,702 | 10/1953 | Chapin | 68/23.7 X |
| 3,216,226 | 11/1965 | Alger et al. | 68/23 R |
| 4,437,325 | 3/1984 | Herschberger | 68/23.7 |
| 4,474,038 | 10/1984 | McMillan | 68/23 R |
| 4,556,827 | 12/1985 | Erdman | 318/254 |
| 4,642,536 | 2/1987 | Boyd, Jr. et al. | 68/12 R X |
| 4,689,973 | 9/1987 | Herschberger | 68/23.7 |
| 4,731,570 | 3/1988 | Lee | 318/685 X |
| 4,779,430 | 10/1988 | Thuruta et al. | 68/12 R |
| 4,819,460 | 4/1989 | Obradovic | 68/23.7 |
| 4,857,814 | 8/1989 | Duncan | 318/281 |
| 4,959,596 | 9/1990 | MacMinn et al. | 318/254 |

Primary Examiner—Philip R. Coe
Attorney, Agent, or Firm—Radford M. Reams; H. Neil Houser

[57] ABSTRACT

A fabric washing machine includes a container to receive fluid and fabrics to be washed in the fluid. A switched reluctance motor includes a stator and a rotor directly connected to the container so that the rotor and container oscillate together to wash the fabrics and continuously rotate together to extract fluid from the fabrics. A control stores a plurality of sets of empirically determined wash values representing instantaneous rotor velocities, calls up individual values in a predetermined timed sequence and controls the motor in accordance with the currently called up value to provide oscillation of the rotor and container. User operable means selects which set of wash values is used in a particular wash operation. The control also stores a set of empirically determined spin values representing instantaneous rotor velocities. User operable means selects at least one spin value representing a rotor velocity less than the maximum velocity represented by any stored spin value. The control calls up spin values from the stored set of spin values, compares the called up value with the user selected value and controls the extraction operation in accordance with the compared value representing the lower velocity.

64 Claims, 16 Drawing Sheets

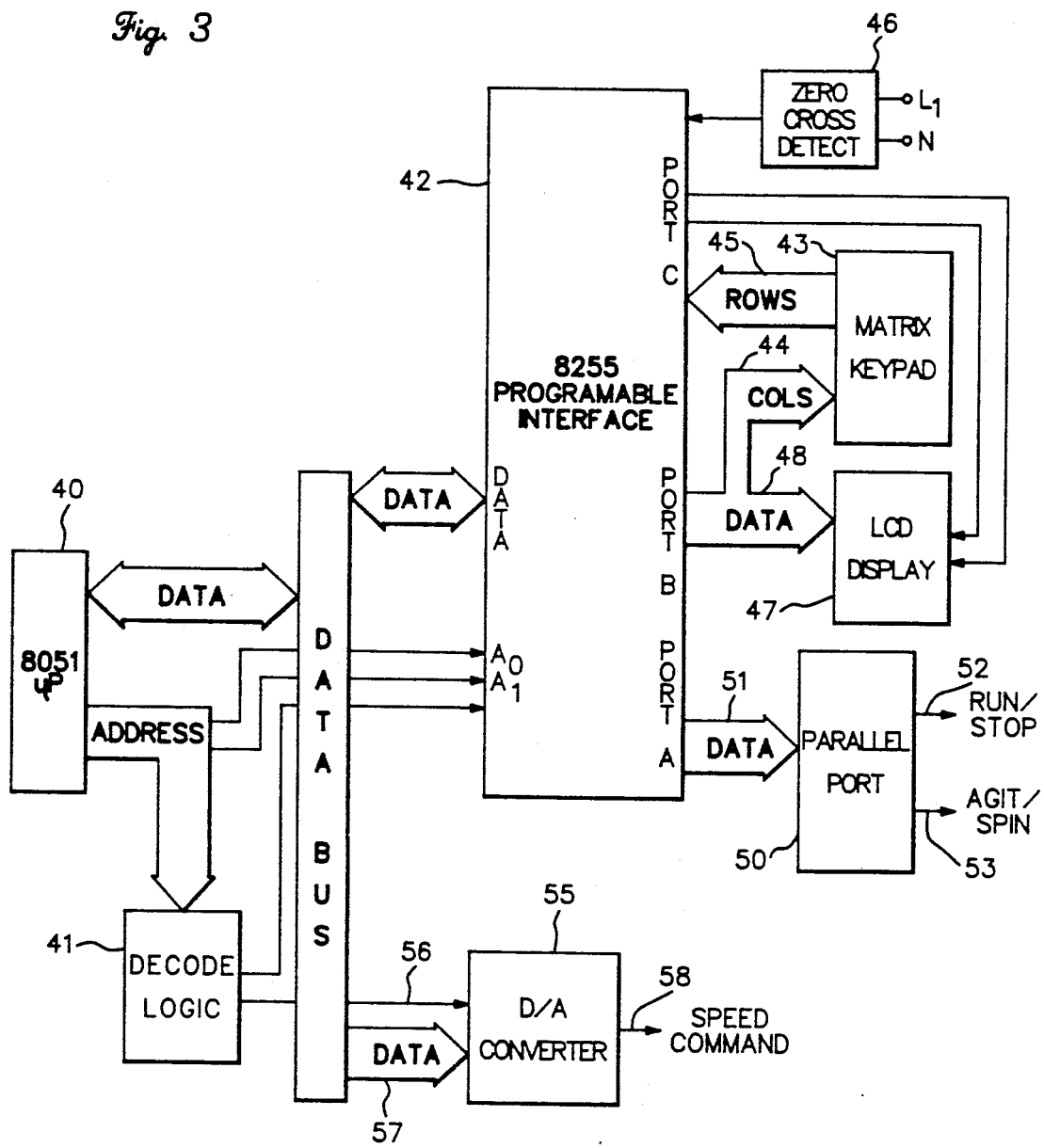

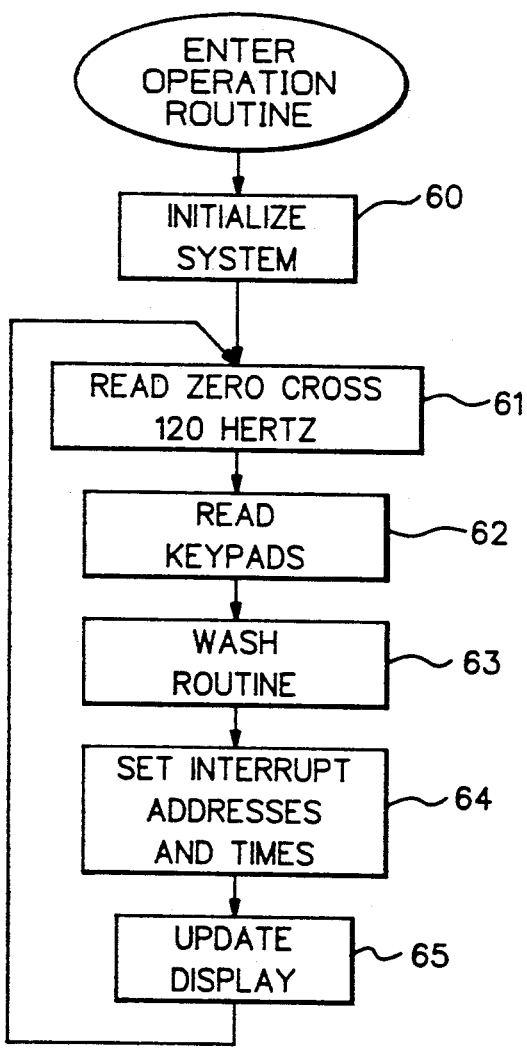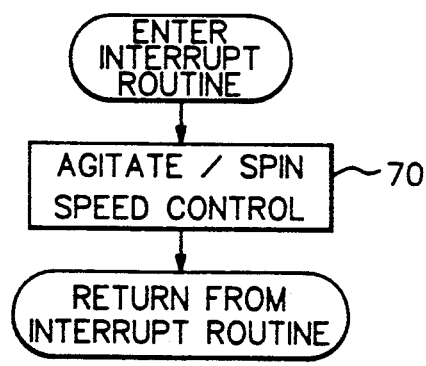

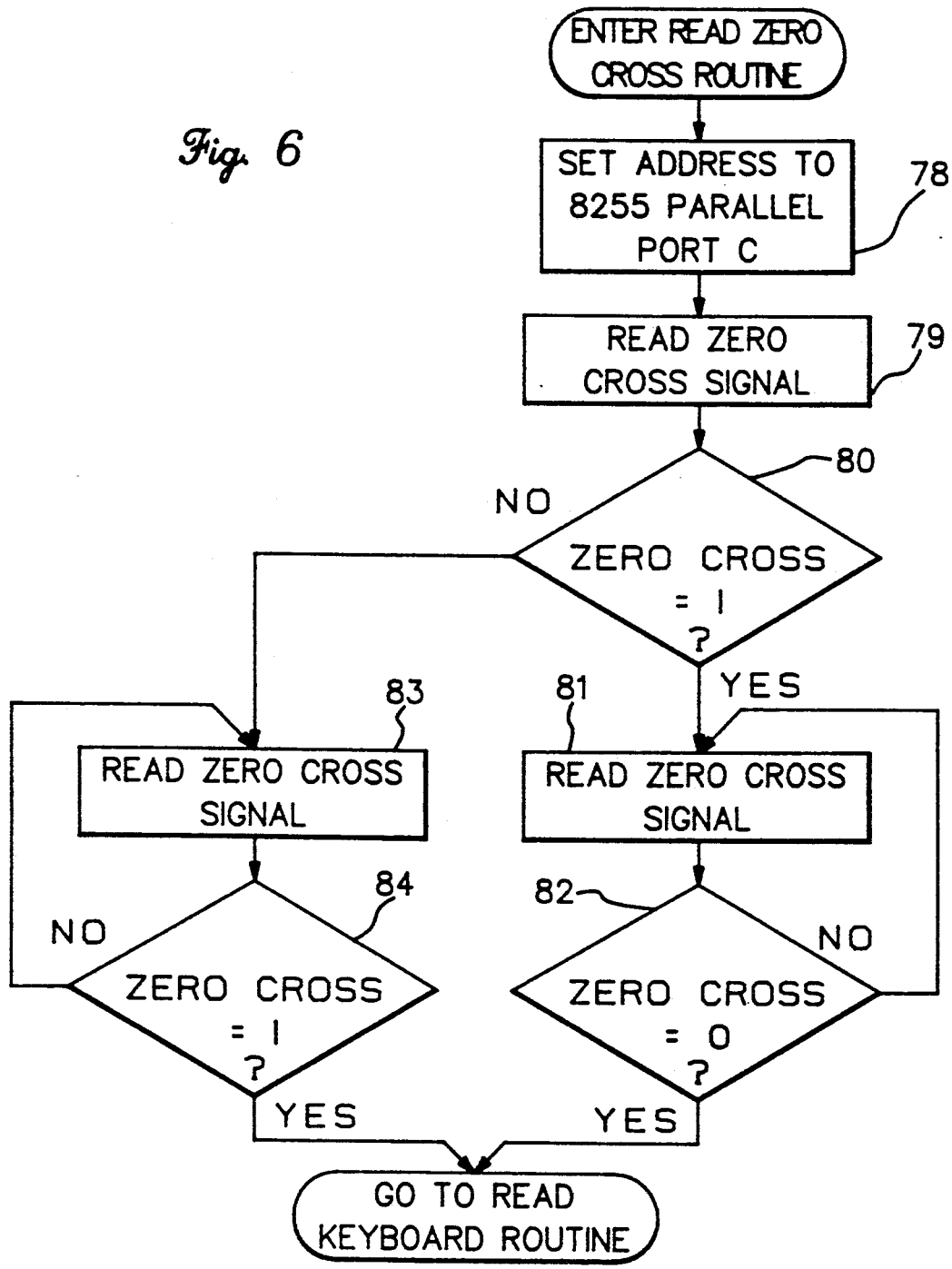

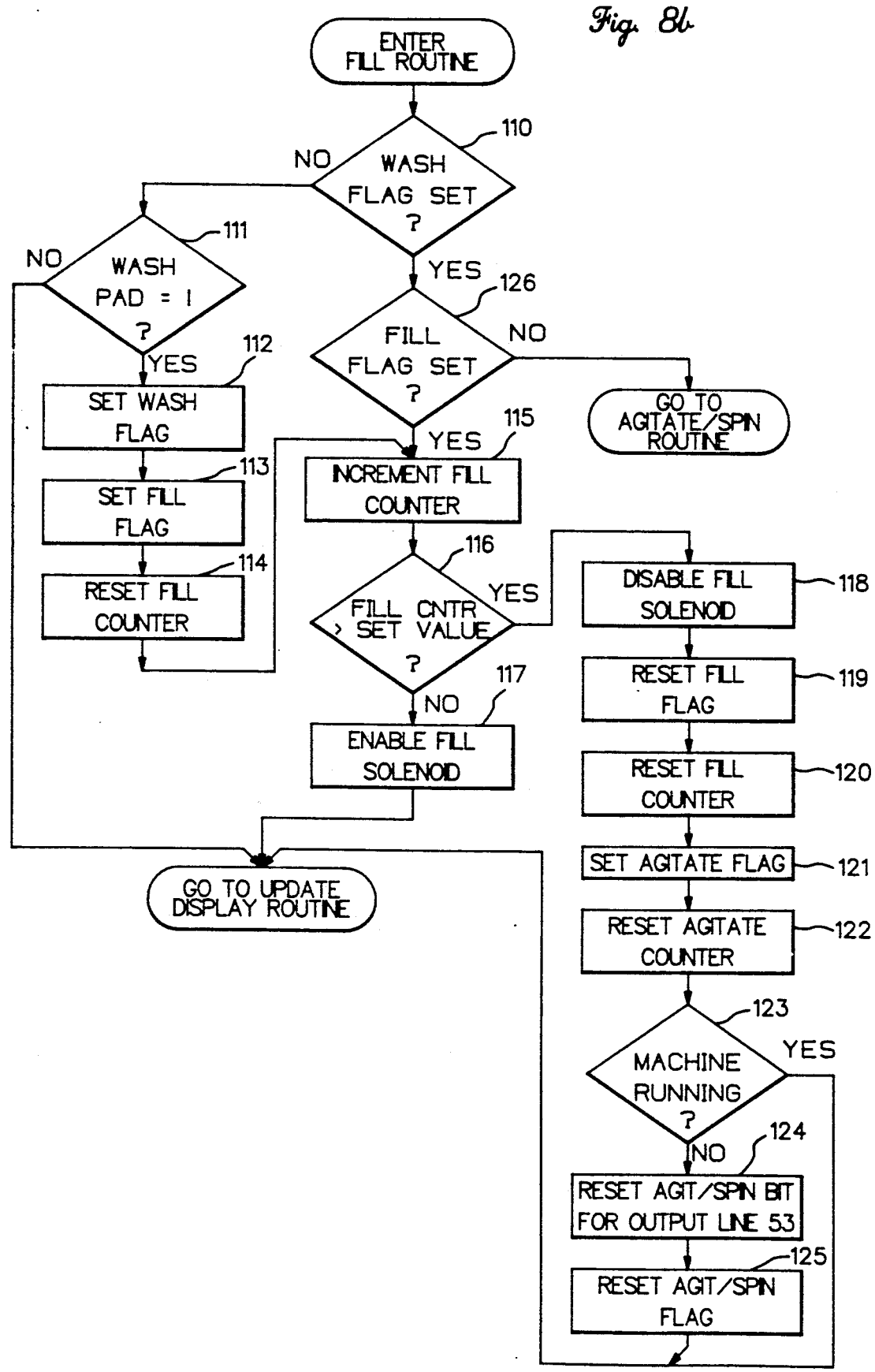

Fig. 11 Mini Load Waveform Curve

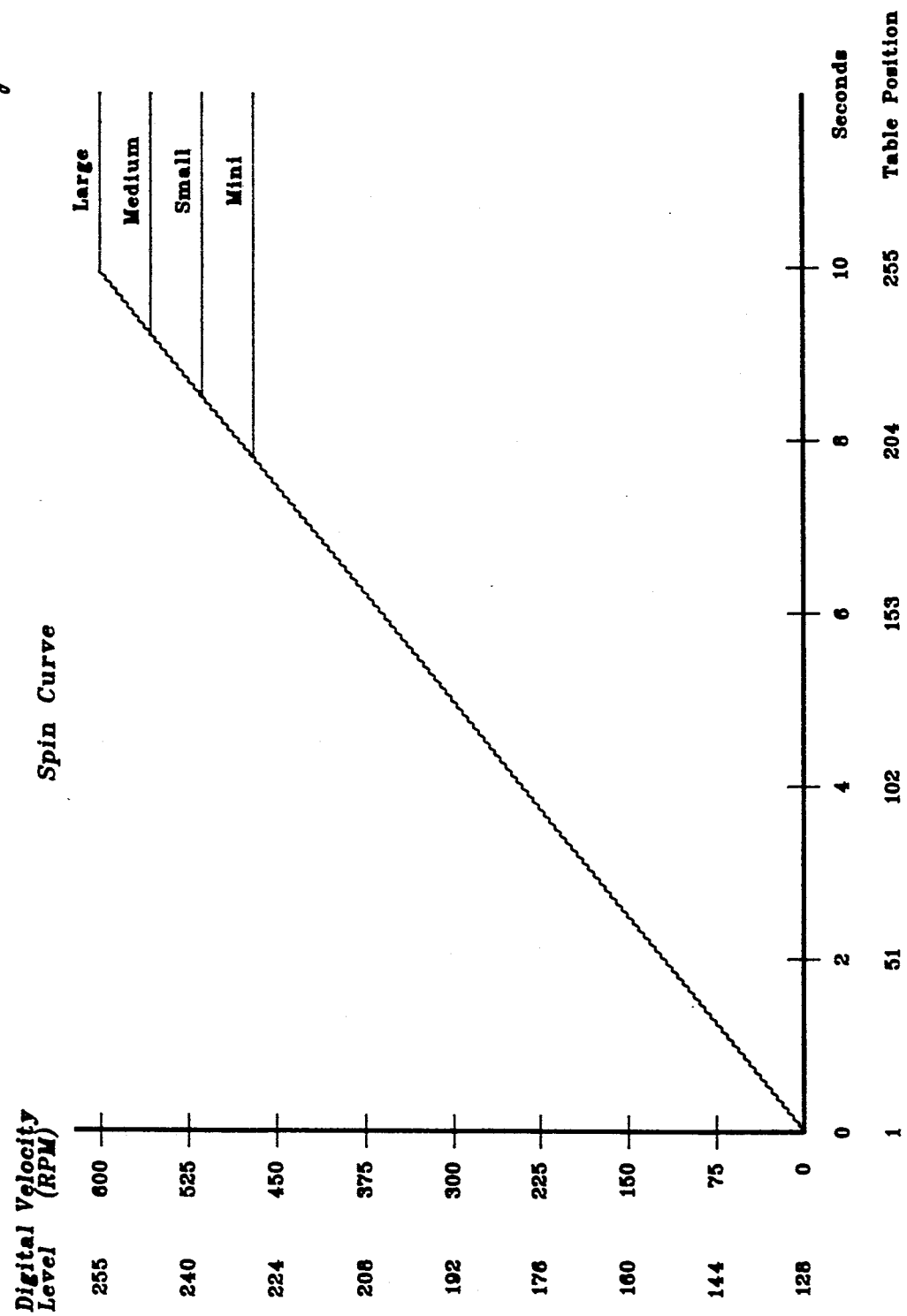

5,076,076

DIRECT DRIVE OSCILLATING BASKET WASHING MACHINE AND CONTROL FOR A WASHING MACHINE

FIELD OF THE INVENTION

This invention relates generally to a laundry apparatus or automatic washing machine and, more particularly, to an oscillating basket fabric washing machine; to such a machine with a direct drive powered by a switched reluctance, electronically commutated electric motor; and to a laundry apparatus control using empirically predetermined values representative of desired motor angular velocities.

BACKGROUND OF THE INVENTION

Conventional laundry washing machines include a tub, a perforated basket mounted in the tub and an agitator mounted in the basket. Fabrics to be washed are placed in the basket and water and detergent are added to the tub (and thus the basket). The agitator is oscillated to agitate the fabrics and fluid and then the agitator and basket are rotated at high speed to extract the fluid, The process is repeated without detergent to rinse the fabrics.

Conventionally the agitator and basket are driven from an AC electric motor through a transmission. When the rotor of the motor rotates in one direction, the transmission converts the rotary input into a reciprocating or oscillating output drive for the agitator. Such agitator oscillation normally is sinusoidal in form. When the rotor rotates in the other direction, the transmission rotates the agitator and basket together at high speed to extract the liquid. Such transmissions are expensive to build and add considerably to the weight of the washing machine. Also, the agitator oscillation conventionally has been limited to some form of sinusoidal movement, which is an inhibiting factor in most effectively tailoring the wash action to the fabric load.

Multi-speed drives have been used to add some degree of flexibility. One approach utilizes multi-speed motors while another employs multi-speed clutches. While each provides differentiated wash speeds, neither approach changes the basic limitation of one wash motion.

Such agitator machines typically include clutches, mode shifting mechanisms, pulleys and gear mechanisms. Also it often is necessary to offset the motor from the axis of the agitator and transmission which, in turn, requires the addition of a counterweight. All of these kinds of items add to the complexity and cost of such machines.

More recently other approaches have been suggested. One example is U.S. Pat. No. 4,449,079—David M. Erdman, assigned to General Electric Company the assignee of the present invention, which patent is incorporated herein by reference. This patent discloses a laundry machine driven by an electronically commutated D.C. motor such that various agitation wave shapes are possible. The control in the Erdman approach senses motor speed and compares the actual sensed value with a desired value to produce an error signal used in controlling the motor.

An oscillating basket washer does not have a separate agitator for imparting wash energy to the fabrics being washed. Rather vanes or ribs are fabricated as part of or attached to the basket and the basket is oscillated to impart wash energy. No oscillating basket design has proven to be have enduring commercial success and agitator machines have become predominant.

SUMMARY OF THE INVENTION

Among the several objects of the present invention are the provision of an improved laundry machine which overcomes at least some of the discussed disadvantages of the prior art; the provision of such a machine in which the control stores at least one set of empirically determined wash values representative of desired motor velocities, calls up the values in a predetermined timed sequence to control the motor to provide a desired wash stroke; the provision of such a machine and control which provide one or more wash strokes with multiple phases such as acceleration, constant velocity and deceleration, in which each phase is independent of other phases and may be asymmetric to other phases; the provision of such a machine in which the control stores a set of empirically determined spin values representative of desired motor velocities and calls up the values in a predetermined timed sequence to provide an extraction operation, and which also compares the called up value with a user selected value and operates the motor in accordance with the compared value representative of the lower velocity; and the provision of such a machine including an oscillating basket directly driven by a switched reluctance motor which is electronically commutated.

In general, a fabric washing machine in accordance with one form of the invention includes a wash container to receive fluid and fabrics and oscillatable to agitate the fluid and fabrics. A switched reluctance motor includes a stator and an oscillatable rotor. A drive shaft directly connects the rotor to the container so that the container moves in the same direction and at the same angular velocity as the rotor. An operation control, operatively connected to the motor, includes a memory which stores a set of wash values representative of desired rotor velocities and the control calls up the values in a predetermined timed sequence and operates the motor in accordance with the then called up value to provide a wash stroke of the wash container. Further, in general, the memory stores a plurality of sets of wash values and user operable means selects the set of values for call up.

Also, in general, and in accordance with various embodiments of this invention, each of the individual values is independent of the other values and the sequence of values called up in each phase of a wash stroke are independent of the sequence of values in other phases. In a typical wash or agitation cycle the agitation means oscillates through a cycle which includes acceleration in the forward direction, constant velocity in the forward direction, deceleration in the forward direction, acceleration in the reverse direction, constant velocity in the reverse direction and deceleration in the reverse direction. While the values in each phase are generally related they are independent. In an acceleration phase, for example, subsequently called up values generally will represent higher velocities. However, the increase in represented velocity does not have to be the same each time or from time to time. The same value can be called up more than once in sequence to provide a discrete step in the acceleration phase. The values and sequence of value call up can be asymmetrical from phase to phase. Thus the acceleration and deceleration phases in one direction may be asymmetric and corresponding phases in different directions may be asymmetric. In addition a small variation in velocity can be introduced in a constant velocity phase if desired.

Also, in accordance with certain embodiments of this invention, the control includes timer means to establish the time period between successive call ups of values in each set of values and user operable means selects the particular time period between successive call ups. Thus, different operations can be provided in several ways. For example, values can be called up from the same set of values but with different time periods between call ups; values can be called up from different sets of values but with the same time period between call ups and values can be called up from different sets of values with different time periods between call ups.

Further, in general, the memory stores a set of empirically determined spin values representative of instantaneous rotor velocities and the control calls up the values in a predetermined timed sequence and operates the motor in accordance with the then called up value to provide an extraction operation. Also, in general, user operable means selects one of a number of values representative of predetermined maximum constant extraction velocities. The control operates to compare the value called up from memory with the selected maximum velocity value and to operate the motor in accordance with the value representative of the lower velocity.

BRIEF DESCRIPTION OF THE DRAWINGS

FIG. 3 is a simplified schematic diagram of a control circuit illustratively embodying a laundry control system in accordance with one form of the present invention as incorporated in the control illustrated in FIG. 2;

FIG. 4 is a simplified flow diagram of the Control program for the microprocessor in the circuit of FIG. 3;

FIG. 5 is a simplified flow diagram of the Interrupt routine incorporated in the control program of FIG. 4;

FIG. 6 is a simplified flow diagram of the Read Zero Cross routine incorporated in the control program of FIG. 4;

FIGS. 8a–8c are a simplified flow diagram of the Wash routine incorporated in the control program of FIG. 4;

FIG. 16 illustrates exemplification rotor velocity wave shapes for centrifugally extracting fluid from various size clothes loads.

DESCRIPTION OF THE PREFERRED EMBODIMENTS

Figure 1:
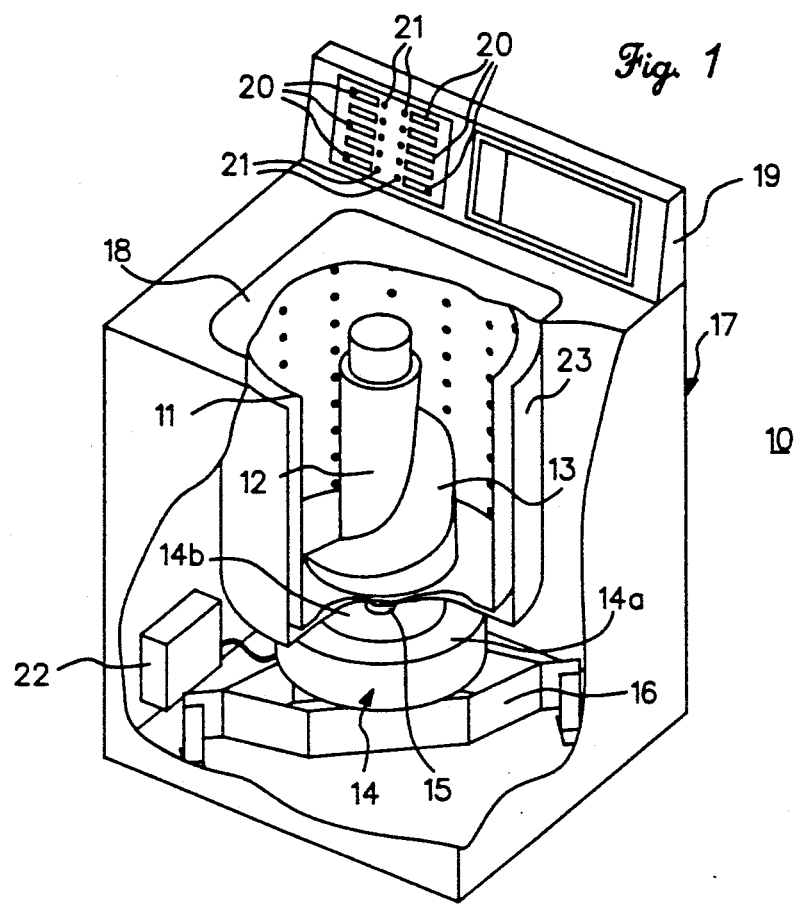
FIG. 1 is a schematic perspective view of a fabric washing machine incorporating one embodiment of the present invention, the view being partly broken away, partly in section and with some components omitted for the sake of simplicity.

Referring now to FIG. 1 there is illustrated a laundry machine or automatic washing machine 10 incorporating one form of the present invention. The washer 10 includes a perforated wash container or clothes basket 11 which has an integral center post 12 and agitation ramp 13. The basket 11 is received in a imperforate tub 23. In operation clothes or other fabrics to be washed and detergent are placed in the basket 11 and water is added to the tub 23. As result of the perforations in the basket 11 the water fills the tub and basket to substantially the same height. The basket is oscillated back and forth about the vertical axis of the center post 12 and the ramp 13 causes the fluid and fabrics to move back and forth within the basket to clean the fabrics. At the end of the agitation operation the standing water in the tub 23 is drained and the basket 11 then is rotated at high speed to centrifugally extract the remaining water from the fabrics. The operation is then repeated without detergent to rinse the fabrics. It will be understood that the ramp 13 is illustrative only and any number of other basket configurations can be used to enhance the agitation of the fabrics. For instance vanes can be formed on the side or bottom walls of the wash container 11 as is well known in the art.

The basket or container 11 is oscillated and rotated by means of a switched reluctance motor (SRM) 14 which includes a stator 14a and a rotor 14b. The rotor 14b is directly and drivingly connected to the basket 11 by suitable means such as shaft 15. To this end, one end of the shaft 15 is connected to the rotor 14b and the other end of the shaft is connected to the interior of the center post 12. The basket, tub and motor are supported by a vibration dampening suspension schematically illustrated at 16. The operating components of the washer are contained within a housing generally indicated at 17, which has a top opening selectively closed by a door or lid 18. The housing 17 includes an escutcheon or backsplash 19 which encloses various control components and mounts user input means such as key pads 20 and user output or condition indicating means such as signal lights 21. A portion of the control for the washer may be mounted within the main part of the housing 17 as illustrated by the small box or housing 22 which conveniently can mount drivers and power switch means, such as a transistor bridge, for the SRM 14.

In accordance with certain aspects of the present invention an operation control stores a number of sets of empirically determined wash values which represent instantaneous angular velocities of the rotor of the SRM and thus of the basket 11. The sets of numbers are stored as look up tables in the memory of microprocessor 40. The control calls up the values in a predetermined timed sequence and controls the motor in accordance with the then current or latest called up value to provide a wash stroke of the basket 11. One wash stroke of the basket 11 is one complete oscillation. For example assuming the basket is at a momentary stationary position, one wash stroke includes movement of the basket in a first direction and then return of the basket in the second direction to essentially its original position. A wash cycle or wash operation includes the number of repetitions of the wash stroke to complete the washing or agitation of the fabrics in the detergent solution. A rinse stroke and rinse cycle merely are forms of a wash stroke and wash cycle in which the basket is oscillated about its vertical axis with a load of fabrics and water but with no detergent in order to remove residual detergent left from a previous wash cycle. User operated means such as, for example, certain of the keypads 20 select which set of stored values is used by the control to operate the motor for a particular cycle. For example, in the illustrative embodiment different keypads are provided for designating the size of the fabric load to be washed; such as, mini, small, medium and large for example.

In accordance with other aspects of the present invention the operation control stores, as another look up table, a set of empirically determined spin values representative of instantaneous rotor speeds, calls up these values in a predetermined timed sequence and controls operation of the motor in accordance with the then currently called up value to provide a spin or centrifugal extraction operation of the basket 11. In a spin operation the basket is accelerated to a designated terminal speed and then operated at that terminal speed for a predetermined period of time in order to centrifugally extract fluid from the fabrics in the basket. User input means in the form of certain of the keypads 20 selects the desired terminal speed of the rotor, less than the terminal speed provided by the set of stored values. The control compares each called up value with the user selected terminal value and operates the motor in accordance with the value which represents the lower rotor speed. Thus the terminal speed is user controlled. By way of example the keypads that select the terminal speed may be the same pads that select the mini, small, medium and large load size for the wash cycle. In that event, to save microprocessor memory space, the large load keypad may not input a terminal speed value and the control will operate the motor at the terminal speed determined by the set of stored spin values. The other keypads will select progressively lower terminal speeds with the mini load pad selecting the lowest speed.

Figure 2:
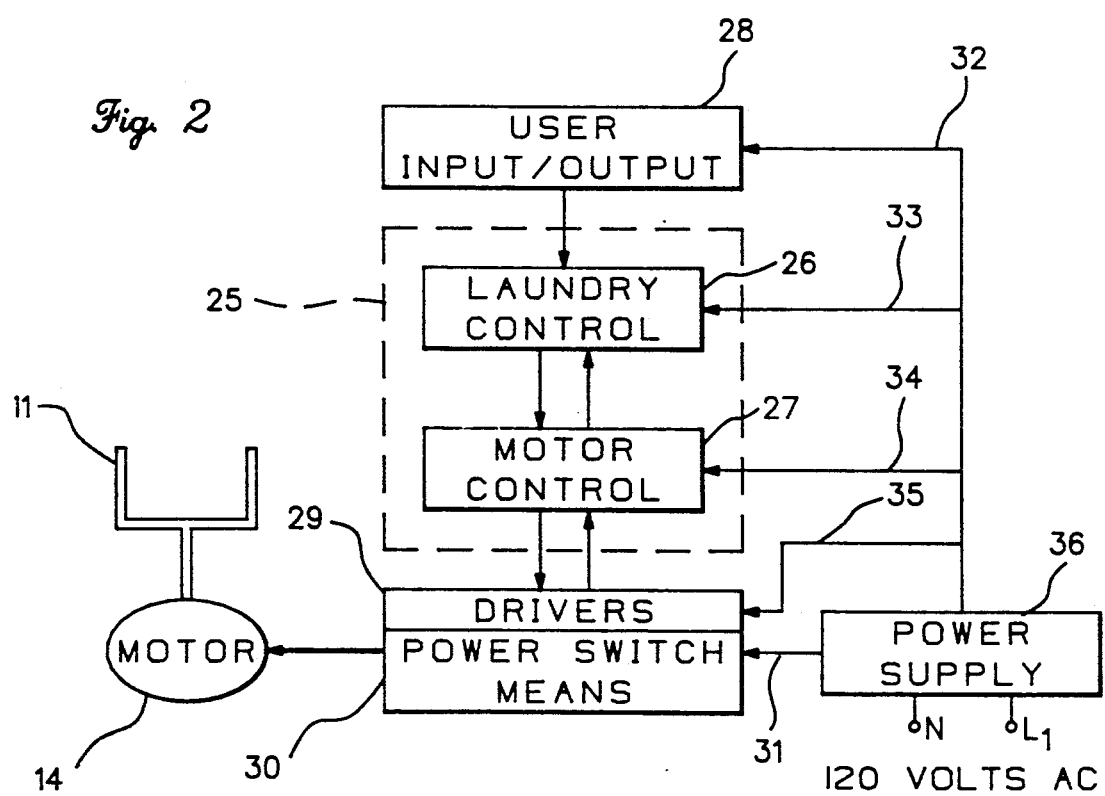
FIG. 2 is a block diagram of an electronic control for the machine of FIG. 1 and incorporating one form of the present invention.

FIG. 2 illustrates, in simplified schematic block diagram form, a washer control incorporating one embodiment of the present invention. An operation control 25 includes a laundry control 26 and a motor control 27. The laundry control 26, as well as its interface with other components such as the user input/outputs 28 and the motor control 27, will be described in more detail hereinafter. A motor control suitable for use with the laundry control 26 is illustrated and described in U.S. Pat. No. 4,959,596, issued on Sept. 25, 1990 to S. R. MacMinn et al, and assigned to General Electric Company assignee of the present invention which application is incorporated herein by reference. That patent also illustrates and describes in some detail an appropriate SRM.

Information for the particular operation the machine is to perform is inputted by user input/output means indicated by box 28 and which conveniently may include touch pads 20 and signal lights 21 for example. In addition to inputting the load size, keypads 20 also can be used to select a water level (if it is desired to select the water level independent of the load size input) the water temperature, and the overall length of a wash operation. The signal lights 21 are selectively activated by the control 25 so that the user is able to determine the operational condition of the machine. The output from the motor control 27 goes to drivers 29 and power switch means (such as a power transistor circuit) 30 which, in turn, supplies commutated power to the motor 14. A conventional power supply generally indicated at 36 is connected to the normal 120 volt, 60 hertz domestic electric power. The power supply provides 155 volt rectified DC power to the power switch means through line 31 and 5 volt DC control power to the other components through lines 32, 33, 34 and 35, respectively.

FIG. 3 schematically illustrates an embodiment of a laundry control circuit 26 for the automatic washing machine of FIG. 1. The circuit in FIG. 3, and the related flow diagrams to be described hereinafter, have been somewhat simplified for ease of understanding the present invention. In the system of the present invention, control is provided electronically by microprocessor 40 which, in the illustrative control, is an 8051 microprocessor commercially available from Intel Corporation. The microprocessor 40 has been customized by permanently configuring its read only memory (ROM) to implement the control scheme of the present invention. Microprocessor 40 is connected to a conventional decode logic circuit 41 which is interconnected with other components to provide the appropriate decode logic to such components, as illustrated by the thin lines and arrows. As indicated by the wide arrows labeled DATA, microprocessor 40 interfaces with various other components to transfer data back and forth. The interface principally is by means of an 8255 programmable interface module 42 commercially available from Intel.

The keypads 20, which provide control input data, are in the form of a conventional tactile touch type entry keypad matrix 43. As is well known, such a matrix arranges the keypads in columns and rows, for instance a 4×5 array has five columns of four keys each. At the appropriate time in the program the microprocessor 40 strobes the columns (arrow 44) in sequence and reads the rows (arrow 45). Thus, when a particular keypad has been actuated and the column in which it is located is strobed, the signal for that row indicates that particular pad is actuated.

As will be more fully described hereinafter, sequencing of the microprocessor is timed by sensing the zero crossings of the alternating current input power. To this end the input of a conventional zero crossing detection circuit 46 is connected to the input power lines ($L_1$ and N) and the output of the circuit 46 is connected to the programmable interface module 42. The particular zero cross detection circuit used in the exemplification embodiment provides a signal pulse for each positive going crossing and each negative going crossing of the input power. Thus the microprocessor receives a timing signal once each half cycle of alternating current or approximately once each 8.33 milliseconds with a 60 hertz power signal.

The display lights 21 are contained in an LCD display 47. The decode logic for display 47 is provided from Port C of the programmable interface module and data is provided from Port B of the programmable interface module as illustrated by DATA arrow 48. Thus individual ones of lights 21 will be illuminated as called for by the program executed by the microprocessor. A parallel port module 50 is connected to Port A of the programmable interface (DATA arrow 51) and includes outlet ports connected to two output lines 52 and 53. Thus, in accordance with the program executed by the microprocessor, the parallel port module provides run and stop signals to the motor control 27 through the output line 52 and agitation and spin control signals to the motor control through output line 53. A D/A converter module 55 receives decode logic (arrow 56) and data (arrow 57) and has an output line 58. Thus, in accordance with the program executed by microprocessor 40, D/A converter 55 provides speed commands or signals to motor control 27 through the output line 58.

FIGS. 4-10 and FIG. 15 illustrate various routines performed by the laundry control in accordance with one embodiment of the present invention. FIG. 4 illustrates the overall operation of the control system generally as follows. When the control is first turned on, the system is initialized (block 60) as is well known with microprocessor controls. Then (block 61) the control reads the zero crossing of the 60 hertz power supply. That is, the control waits until the zero crossing detector 46 indicates that the power supply voltage has again crossed zero voltage. Thereafter, the control reads the keypads (block 62). That is the columns of the matrix 43 are strobed and the rows are read to determine which keypads have been actuated. At block 63 the Wash routine is executed. At block 64 the addresses and the control times for laundry control 26 are set for the interrupt routine. At block 65 the LCD display 47 is updated. Thereafter the control returns to block 61 and waits for the next zero crossing of the 60 hertz input power signal. When the signal again crosses zero the operation routine is repeated.

As previously explained laundry control 26 stores a number of sets of empirically determined values representative of particular angular speeds of the rotor 14b of SRM 14, calls up individual values in a predetermined timed sequence and operates the motor in accordance with the then currently called up value to provide a wash stroke to the basket 11. In the illustrative machine and control there are four sets of values or look up tables; which, for reference purposes are referred to as a mini or very small load set, a small load set, a medium load set and a large load set. Each set of values is chosen to have 256 individual values for the sake of convenience and ease of operation as 256 ($2^8$) is a number easily manipulated by microprocessors. In addition, the microprocessor memory storing the individual sets of values is addressed 256 times for a single stroke as will be explained in more detail hereafter. As will be noted by reference to FIG. 14, the wash stroke for an exemplification large load wave form takes only approximately 1.2 seconds. Within that 1.2 seconds the memory in the microprocessor is interrogated and a corresponding speed control signal is sent to the motor control by the D/A converter 256 times. Thus it will be seen that the motor speed control signals are generated at a very high rate in comparison to the 8.33 millisecond period of the overall operation routine.

As illustrated in FIG. 5, when it is time to send a new speed control signal to the motor control, an Interrupt routine interrupts the Operation routine, generates and transmits the speed control signal and then returns from the Interrupt routine back to the overall Operation routine. The time between successive entries of the Interrupt routine determines the frequency of call ups of numbers or values which define the frequency of the agitation stroke and the acceleration of the spin speed respectively. Upon entering the Interrupt routine inquiry 70 determines whether the machine is in the wash (agitate) mode or the spin mode. If the machine is in the wash (agitate) mode, the control selects the appropriate agitate look up table for the particular load size, calls up the next successive value in that table and transmits that value to the D/A converter 55. If the machine is in the spin mode, the control selects the spin look up table, calls up the next successive value in that table and transmits the appropriate value to the D/A converter. This operation, generally indicated at 70, will be described in more detail hereinafter.

FIG. 6 illustrates the Read Zero Cross routine of block 61. When the Read Zero Cross routine is entered the address is set to Port C of the programmable interface module 42 (block 78), which enables the output of the zero cross detection circuit 46 to be inputted to the microprocessor 40 via the interface module 42. If the power line signal is in a positive phase of its waveform, the output of zero cross detector 46 (designated ZCROSS) is a logic 1. If the power line signal is in a negative phase, ZCROSS is a logic 0. After inputting the zero cross signal, the control reads the value of ZCROSS (block 79) and determines the logic state of ZCROSS (block 80). If ZCROSS is logic 1, the zero cross signal is continually read (block 81) until it is determined that ZCROSS equals logic 0 (block 82). The change from logic 1 to logic 0 signals that the power supply voltage has crossed zero and the control goes to the Read Keyboard routine. If, at block 80, it is determined that ZCROSS is logic 0, the zero cross signal is continually read (block 83) until it is determined that ZCROSS equals logic 1 (block 84). This also signals a zero crossing or transition of the input power, and the control goes to the Read Keyboard routine. The Read Zero Cross routine thus assures that the Read Keyboard routine begins in accordance with a zero crossing or transition of the input power signal on lines L, and N, which synchronizes the timing of the entire control.

Figure 7:
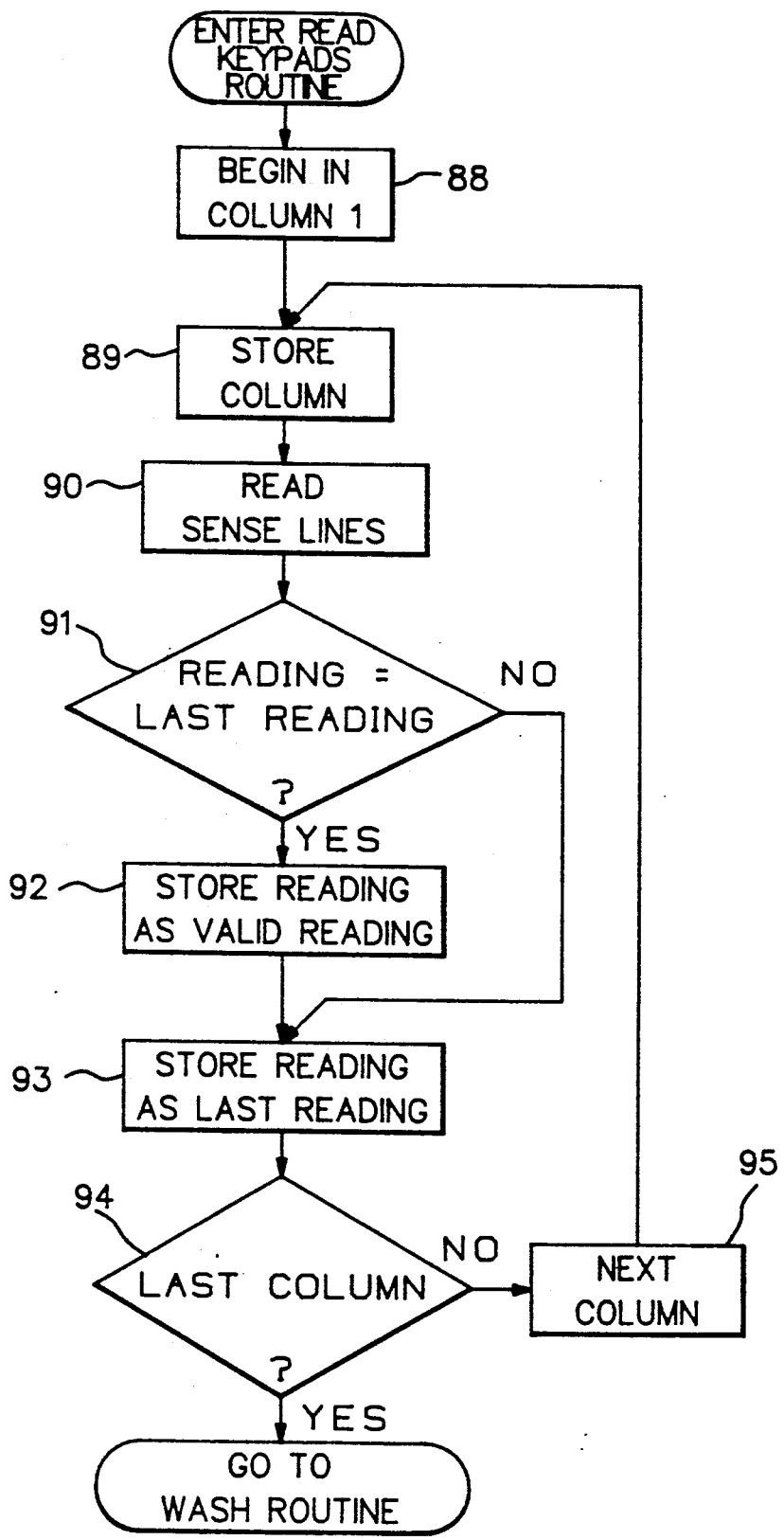
FIG. 7 is a simplified flow diagram of the Read Keypads routine incorporated in the control program of FIG. 4.

In the Read Keypads routine, illustrated in FIG. 7, the control strobes the columns of matrix keypad 43 beginning with the first column (block 88) and successively reads the rows. It stores the number of the column strobed at block 89 and reads the sense lines activated as a result of that strobe at block 90. At block 91 it compares the reading for the latest column strobed with the prior reading of that column which was done 8.3 mSeconds earlier in the previous control cycle. If the readings are identical, the reading is considered valid and is stored at block 92. If the readings are not identical, block 92 is bypassed. In either event the reading is stored at block 93 as the last reading so that it can be used in inquiry 91 during the next pass through the Read Keyboard routine. At inquiry 94 the control then determines if the strobe was of the last column. If no, it increments the column number at block 95 and repeats the Store and Read subroutine of blocks 89-93 until inquiry 94 determines that the last column has been strobed.

Figure 8A:
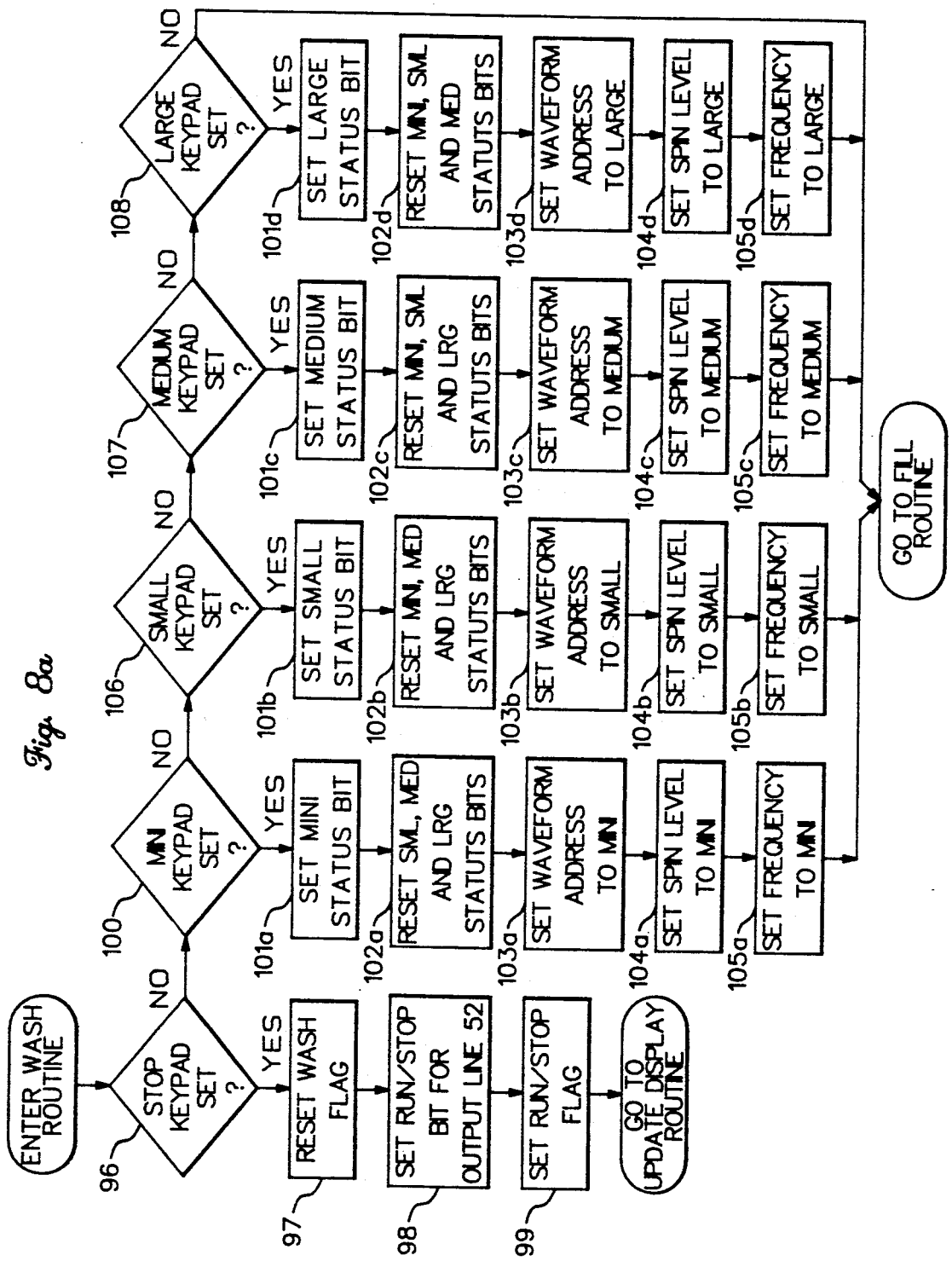
Figure 8C:
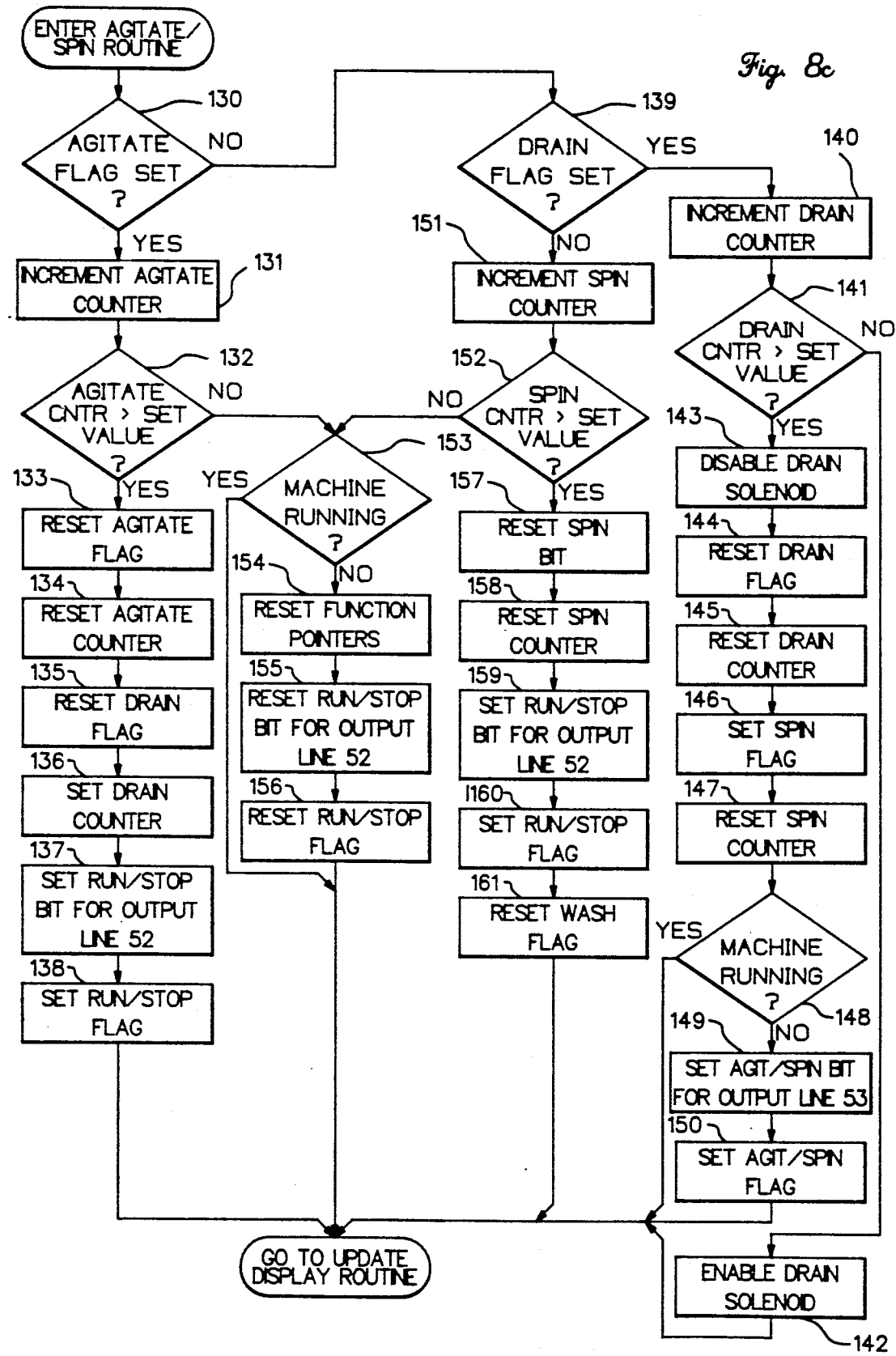

The Wash routine is illustrated in FIGS. 8a, 8b and 8c. The Wash routine is entered in FIG. 8a at inquiry 96 which determines whether the stop keypad is set. The stop keypad may be set in a number of ways. For example, a clock built into the microprocessor or a separate timer will set the stop flag when a cycle of operation has been completed. Many machines have switches which automatically de-energize the machine if the lid is lifted during a spin operation. Such a switch would set the stop keypad. Also if desired, one of the keypads 20 may be utilized as a stop keypad to provide the user with a manual means for stopping operation of the machine. In any event, when the stop keypad is set the machine will be de-energized. Therefore, when the answer to inquiry 96 is yes the wash flag is reset at block 97, the run/stop bit for output line 52 is set at block 98, the run/stop flag is set at block 99 and the program proceeds to the Update Display routine. Setting the run/stop bit at block 98 sends a signal from the laundry control 26 to the motor control 27 which de-energizes the motor 14.

It should be noted at this point that, in the various routines described herein, "set" corresponds to the related component being energized or activated and "reset" corresponds to the component being de-energized or de-activated. One exception is the run/stop bit 52 for output line 50. When this bit is "set" the motor is de-energized and when it is "reset" the motor is energized for convenience in relating the present description to that of U.S. Pat. No. 4,959,596 which uses a protocol in which set means de-energized and reset means energized.

If inquiry 96 determines that the stop keypad is not set, then inquiry 100 determines if the mini load keypad is set. If yes, the mini load status bit is set at block 101a; the small medium and large status bits are reset at block 102a; the wave form address in the microprocessor read only memory (ROM) is set to the mini load look up table at block 103a, the maximum spin level value is set to the mini load size at block 104a and the frequency is set to the mini load size at block 105a. The program proceeds to the Fill routine.

The frequency relates to the time period between call ups of successive values in the set of values (look up table) in the microprocessor ROM that are being called up to control the agitation wave form or spin wave form respectively. In accordance with certain embodiments of the invention, the time period or frequency of call ups may vary depending on the load size.

If inquiry 100 determines that the mini load keypad is not set, then inquiry 106 determines whether the small load size keypad is set. If yes, the small load status bit is set at block 101b; the mini, medium and large load status bits are reset at block 102b; the wave form address is set to small load at block 103b; the spin level is set to the small load size at block 104b and the frequency is set to the small load size at block 105b. The program then proceeds to the Fill routine.

If inquiry 106 determines that the small load keypad is not set, then inquiry 107 determines whether the medium load keypad is set. If yes, the control is set for a medium load of fabrics at blocks 101c-105c and the program continues to the Fill routine. If inquiry 107 determines that the medium keypad is not set, inquiry 108 determines whether the large keypad is set. If yes, the control is set for a large fabric load at blocks 101d-105d and the program proceeds to the Fill routine. If inquiry 108 determines that the large keypad is not set the program proceeds directly to the Fill routine. As previously explained the four load size keypads are interconnected and mutually exclusive so that one pad must always be set and no more than one pad can be set at any one time. The "NO" path from inquiry 108 is for initial power up operations, at which time the operator may not yet have activated any of the load size keypads.

The Fill routine, illustrated in FIG. 8b, is entered at inquiry 110 which determines whether the wash flag is set. If the wash flag is not set, inquiry 111 determines if the wash pad equals logic 1. When the wash flag is not set and the wash pad does not equal 1, the last call for a wash operation has been completed or discontinued and the program proceeds directly to the Update Display routine. When inquiry 111 determines that the wash pad equals 1, the wash flag is set at block 112; the fill flag is set at block 113 and the fill counter is reset at block 114 (that is, the fill counter is adjusted to count a full fill operation). The program then proceeds to block 115, where the fill counter is incremented one step. Then inquiry 116 determines if the fill counter is greater than the set value. It will be understood that, with the illustrative machine, the flow rate of water is constant so that the proper amount of water for the selected load will enter the machine in a predetermined time period. When inquiry 116 determines that the fill counter is less than the set value more water is needed and the fill solenoid is enabled at block 117. The program then proceeds to the Update Display routine.

When inquiry 116 determines that the fill counter is greater than the set value the processor knows that the fill function has been completed and sufficient water is in the machine. Therefore the fill solenoid is disabled at block 118; the fill flag is reset at block 119; the fill counter is reset at block 120; the agitate flag is set at block 121, the agitate counter is reset at block 122 and inquiry 123 determines whether the machine is running by checking the status of the run/stop flag. If the machine is running, the program proceeds to the Update Display routine. If the machine is not running, the agit/spin bit for output line 53 is reset at block 124; the agit/spin flag is reset at block 125 and the control program proceeds to the Update Display routine. (For ease of interfacing the present description with that of application Ser. No. 07/332,205, the protocol for agit/spin bit 53 is "set" equals spin and "reset" equals agit.)

Returning to inquiry 110, when the wash flag is set, inquiry 126 determines whether the fill flag is set. If yes the program proceeds to block 115 and from there as described just above. When inquiry 126 determines that the fill flag is not set, the program goes to the Agitate/Spin routine.

Once the fill operation is complete, the Agitate/Spin routine, as illustrated in FIG. 8c, is implemented. Referring now to FIG. 8c, inquiry 130 determines whether the agitate flag is set. If yes, the agitate counter is incremented at block 131 and inquiry 132 determines whether the agitate counter is greater than the set value. It will be understood that the agitation or wash operation will go on for an extended period of time with the basket 11 oscillating to impart washing energy to the fabrics and the water/detergent solution in which they are immersed. In a simple machine this period may always be the same value such as 15 minutes for example. In a more fully featured machine the time may vary depending on the load size, in which case the set value of the agitate counter will be determined for the particular load at the appropriate one of the blocks 101a-101d. When inquiry 132 determines that the agitate counter is greater than the set value, agitation is complete and the program proceeds to reset the agitate flag at block 133; reset the agitate counter at block 134; reset the drain flag at block 135; set the drain counter at 136; set the run/stop bit for output line 52 at block 137 and set the run/stop flag at block 138. This programs the machine for the drain operation and the program then proceeds to the Update Display routine.

When inquiry 130 determines that the agitate flag is not set, the program proceeds to inquiry 139 and determines whether the drain flag is set. If the drain flag is set it means that a drain operation is in progress and the drain counter is incremented at block 140. Then inquiry 141 determines whether the drain counter is greater than the set value. As with the fill counter and agitate counter, the drain counter may always be set to a particular value, such as six minutes for example, or, if desired, the program may set the drain counter at one of blocks 101a-101d to have a period of time corresponding to the load size and thus the amount of water in the machine. When inquiry 141 determines that the drain counter is not greater than the set value it means that the drain operation is called for. The drain solenoid is enabled at block 142 and the program then proceeds to the Update Display routine. When inquiry 141 determines that the drain counter exceeds the set value, it means that the drain operation is complete. At that time the program disables the drain solenoid at block 143; resets the drain flag block 144; resets the drain counter at block 145; sets the spin flag at 146 and resets the spin counter at block 147. Inquiry 148 then determines whether the machine is running. If yes, the program proceeds to the Update Display routine. If no, the agit/spin bit for output line 53 is set at block 149; the agit/spin flag is set at block 150 (which corresponds to a spin operation) and the program proceeds to the Update Display routine.

Upon the completion of the drain operation the drain flag is reset at block 144. On the next pass through the program inquiry 130 will determine that the agitate flag is not set and inquiry 139 will determine that the drain flag is not set, which means that a spin operation is called for. The program thereupon increments the spin counter at block 151 and then inquiry 152 determines whether the spin counter is greater than the set value. As with the previously described counters, the spin counter may always be set to a particular value such as five minutes, for example, or set to a value corresponding to the particular load size at the appropriate one of blocks 101a-101d. When either inquiry 132 determines that the agitate counter is not greater than the agitate set value or inquiry 152 determines that the spin counter is not greater than the spin set value, the machine is in an agitation or spin operation and, in either event, the program proceeds to inquiry 153 which determines whether the machine is running. If yes, the program proceeds to the Update Display routine. When inquiry 153 determines that the machine is not running, the reset function pointers are reset at block 154; the run/stop bit for output line 53 is reset at block 155; the run/stop flag is reset at block 156 to enable the control to restart the motor to provide the appropriate one of wash or spin operation when called for by the microprocessor and the program then proceeds to the Update Display routine.

When inquiry 152 determines that the spin counter is greater than the set value, the spin operation has concluded. At this time the spin bit is reset at block 157; the spin counter is reset at block 158; the run/stop bit for output line 53 is set at block 159; the run/stop flag is set at block 160; the wash flag is reset at block 161 and the program proceeds to the Update Display routine.

Referring to FIGS. 3 and 4 the update display routine (block 65) updates the lights 21 by means of updating the LCD display module 47, shown in FIG. 3. Details of this routine have been omitted as there are a number of well known such routines and it forms no part of the present invention.

The entire operation routine, as generally set forth in FIG. 4, has been described and it will be understood that the most time consuming path through the operation routine takes less than the 8.33 milliseconds between successive zero crossings of the power supply voltage. Thus the program accomplishes a complete pass through the Operation routine of FIGS. 4 and 6-8 and the control then waits for the next zero crossing to repeat the operation. Each fill, agitate, drain and spin operation of the machine continues for several minutes. Thus the routine of FIGS. 4 and 6-8 will be implemented many times during each operation or operational phase of the washing machine. During each pass through the program the appropriate components of the machine, such as the motor, the fill solenoid and the drain solenoid for example, are energized and the appropriate ones de-energized and the appropriate counters are incremented once for each pass through the program. When energized, the solenoids maintain their related components energized. For example, the machine will drain continuously during a drain operation even though the laundry control makes repeated passes through the program with pauses between successive passes until the next zero cross. As previously described, when the control senses that the appropriate counter has exceeded its set value, it branches to the next subroutine which is then repeated a number of times until the set value for that routine is exceeded.

A typical operational sequence of an automatic washing machine includes a first phase of fill, wash agitation, drain and spin followed by a second phase of fill, rinse agitation, drain and spin. The second phase generally repeats the first phase except that no detergent is used and the rinse agitation period may be shorter than the wash agitation period. Thus for the sake of brevity and ease of understanding only the first phase has been described. Also auxiliary operations such as spray rinses have been omitted and they do not form part of the present invention.

As previously described, and in accordance with certain aspects of the present invention, a number of sets of agitation or wash values are stored in the form of look up tables in the ROM of microprocessor 40 and are called up by the microprocessor so that control 25 operates motor 14 at a speed corresponding to the current or last called up value. As an example, in the machine and control of the preferred embodiment there are four sets of empirically determined values, called mini, small, medium and large load sizes for reference. A corresponding one of the keypads 20 is operated by the user to select the appropriate set of stored values to be used for a particular washing operation. Appendix A is a set of wash values for a mini load; Appendix B is a set of wash values for a small load; Appendix C is a set of wash values for a medium load; and Appendix D is a set of wash values for a large load. Each set of values includes 256 different numbers from 0 to 255 inclusive. In each set of values the number 128 has been chosen to represent zero angular velocity of the rotor, the number 0 to represent the maximum angular velocity in one direction and the number 255 to represent the maximum angular velocity in the other direction. It will be understood that the values or numbers 0-255 are stored in the ROM memory in a digital (hexadecimal) form and, when stored, each set of values provides a look up table. When called up from memory by the microprocessor 40 the value is transmitted to the D/A converter 55 which sends a corresponding speed command through port 58 to the motor control 27. Each of the numbers 0-255 corresponds to a particular 8-bit parallel output from the microprocessor 40 to the 0/A converter 55. For example, the number or value 0 is 0000 0000; the number 128 is 1000 0000 and the number 255 is 1111 1111. The D/A converter is biased to operate between −5 volts and +5 volts. That is, for example, an input of 0000 0000 to the D/A converter results is a converter output of −5 volts; an input of 1000 0000 results in an output of 0 volts and an input of 1111 1111 results in an output of +5 volts. The conversion factor built into motor control 27 is such that, for agitation operations, output voltages of D/A converter 55 in the range from −5 volts to +5 volts inclusive, represent instantaneous angular velocities of rotor 14b (and thus basket 11) in the range from 150 revolutions per minute clockwise to 150 revolutions per minute counterclockwise, inclusive.

The set of values or look-up table for each load size is stored as eight bit bytes in the ROM of microprocessor 40 in 256 separate locations. A pointer for each set incorporated in the microprocessor initially points to the first value of that set. When that value is called up the pointer is incremented to the next value and when the last value is called up the pointer is incremented to the initial value. In this way the values of the selected set of values or look-up table are repeatedly called up in sequence throughout an agitation cycle.

Another set of empirically determined values, conveniently called spin values are stored in the form of a spin look up table in another portion of the ROM; are called up by the microprocessor in a predetermined timed sequence and used to control the motor to provide a spin or centrifugal extraction operation in a manner generally as explained for the agitation operation. Appendix E is an exemplary set of spin values. It will be noted from Appendix E and the corresponding speed chart of FIG. 16 that the spin curve accelerates in a number of small steps or increments to a maximum speed which then is held constant. The spin table contains a set of values or numbers that range from 128 to 255, inclusive, and each number represents an 8-bit parallel output from the microprocessor to the D/A converter, as explained hereabove for the agitation operation. D/A converter 55 then outputs voltages in the range from 0 volts to +5 volts, inclusive, for input numbers from 128 (1000 0000) to 255 (1111 1111) respectively. The conversion factor built into the motor control 27 is such that, for the spin operation, the number 128 corresponds zero revolutions per minute and the number 255 corresponds to 600 revolutions per minute of the motor rotor and basket.

In the illustrative embodiment the terminal speed provided by the set of spin values in Appendix E (600 rpm) is used to provide spin for large fabric loads. When the user actuates any of the mini, small or medium load touch pads a lower terminal spin level is set into the memory of the microprocessor. As will be explained more fully hereinafter, each time the microprocessor calls up a spin value from the spin table, it then compares the spin value to the spin level set by the user and operates the motor at a speed corresponding to the value representative of the lower speed.

In the illustrative embodiments, during the agitation cycle, individual values are called up 256 times during one complete oscillation or agitation stroke of the motor 14 and basket 11. After the subsequent drain operation the spin cycle is implemented and individual values are called up from the spin table to bring the basket up to its terminal velocity.

At boxes 105a-105d (FIG. 8A) the frequency of call ups or period between call up of successive numbers is set to correspond to the particular load size selected by the user. This selection programs the interrupt timer in the microprocessor to count the selected interval. When the interrupt timer reaches zero the Operation routine of FIG. 4 is interrupted and the Interrupt routine, generally illustrated by FIG. 5, is executed to update the speed control signal. In the illustrative embodiment the interrupt timer initiates the Interrupt routine to call up a number 256 times for each agitation stroke (wash or rinse) of the rotor and basket for any particular cycle but may vary from load size to load size. The agitation strokes continue until the agitate counter times out the agitation operation (block 132, FIG. 8c).

In spin operation individual values are called up a maximum of 256 times during the acceleration or ramp up phase. After that a constant value is used to provide a constant terminal speed of the basket 11. Terminal speed operation continues until the spin counter times out the spin extraction operation (block 152, FIG. 8c). In a basic control the interrupt timer for the spin operation is preset so that the acceleration or ramp up phase of spin operation follows the same slope regardless of load size. In another embodiment the value preset in the interrupt timer is a function of the load size. In that event the ramp up rate for spin is tailored to the load size.

The time period between (or frequency of) successive call ups of agitate or spin values is implemented by an interrupt timer or counter in the microprocessor 40. The interrupt timer causes the microprocessor to interrupt the main Operation routine of FIG. 4 and enter the Interrupt routine of FIG. 5 at predetermined intervals. The illustrative interrupt timer has a predetermined maximum value and the user inputs an initial value depending upon the load size (105a-105d of FIG. 8a). At a rate set by the internal clock of the microprocessor, the interrupt timer increments from the initial value to the maximum value. When the maximum value is reached, the Operation routine is interrupted and the Interrupt routine is entered. The interrupt timer is repeatedly reloaded with the initial value and times out throughout the agitation and spin acceleration operations. It will be understood that, if desired, the interrupt timer could decrement from an initial value to zero.

Figure 9:
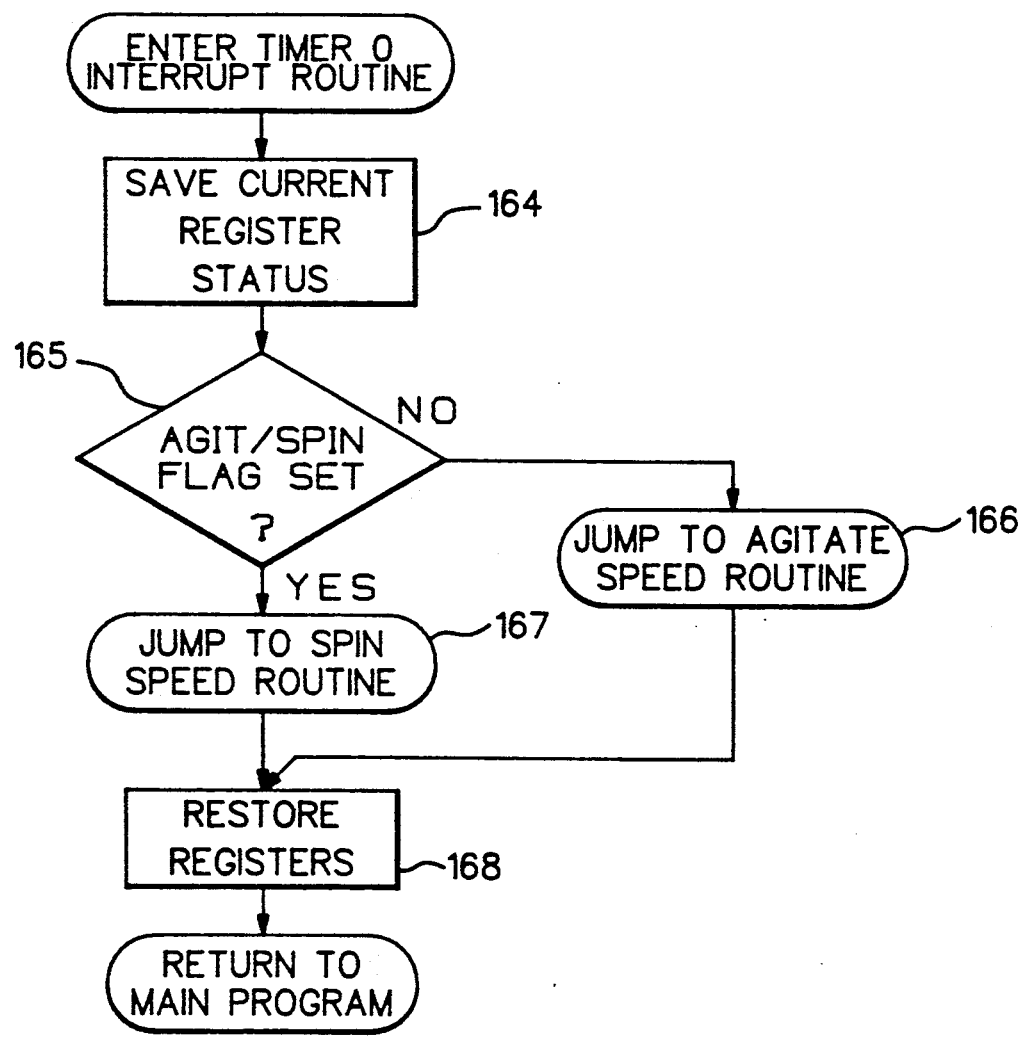
FIG. 9 is a simplified flow diagram of the Timer 0 Interrupt routine for agitate and spin incorporated in the control program of FIG. 4.

A more detailed explanation of the interrupt timer operation or routine is illustrated beginning with FIG. 9. Referring to FIG. 9, when the Timer 0 Interrupt routine is entered the status of each of the registers in the control as heretofor described is saved at block 164. Inquiry 165 then determines whether the agit/spin flag is set. It will be remembered that the set status of the agit/spin flag equates to a spin operation and the reset status of the agit/spin flag equates to an agitate operation. Thus when inquiry 165 determines that the agit/spin flag is reset the program jumps to the Agitate Speed routine as indicated at 166 and, upon completion of that routine, all the registers and counters are restored at block 168. The control then returns to the main operation or routine. When inquiry 165 determines that the agit/spin flag is set, the program jumps to the Spin Speed routine as indicated in 167. When the Spin Speed routine is completed, the registers and counters are restored at block 168 and the control returns to the main program.

Figure 10:
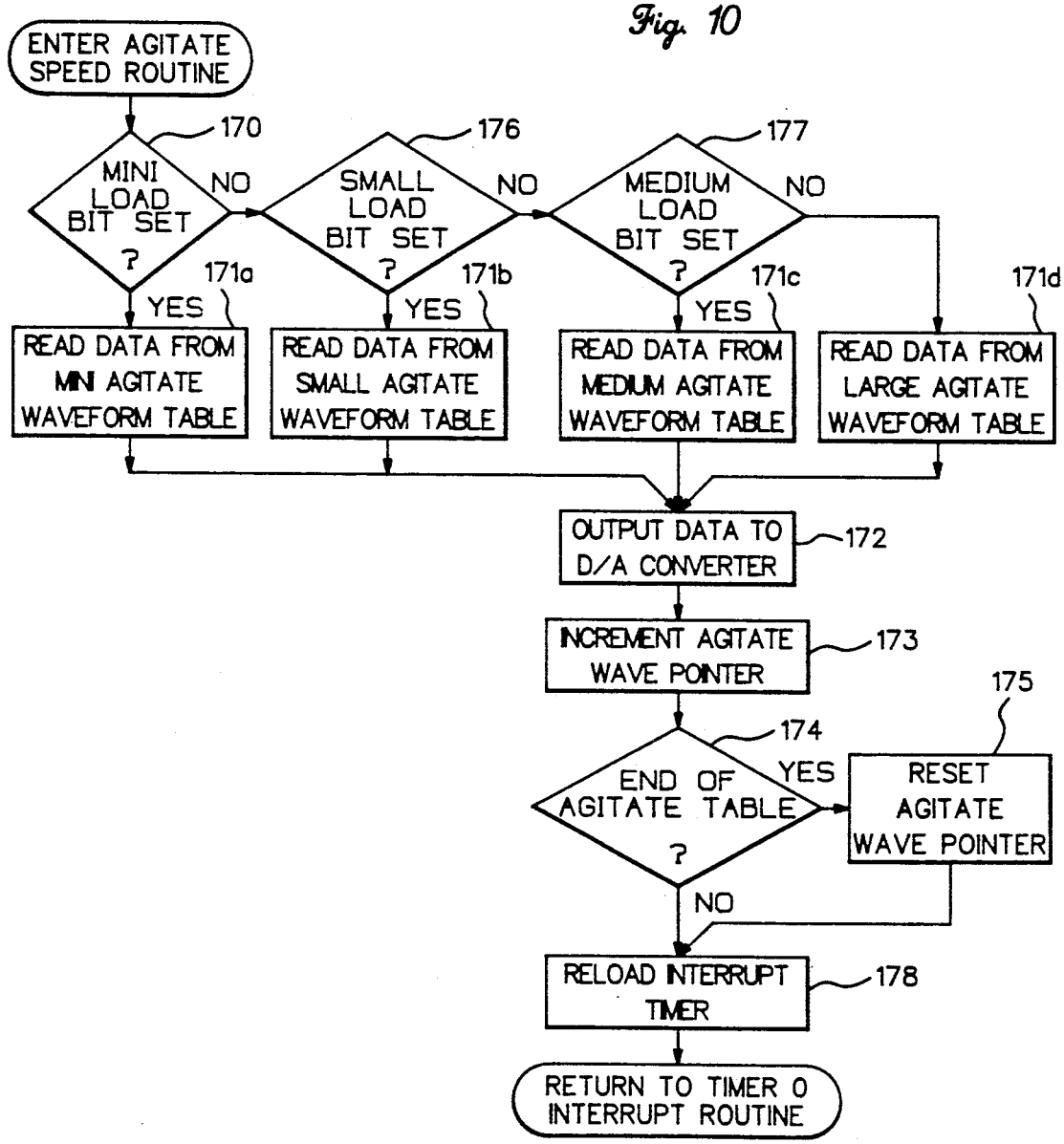
FIG. 10 is a simplified flow diagram of the Agitate Speed routine incorporated in the control program of FIG. 4.

FIG. 10 illustrates the Agitate Speed routine. Inquiry 170 determines whether the mini load bit is set (see blocks 101a-101d in FIG. 8a). If the mini load bit is set, the data from the mini agitate wave form table (Appendix A) is read at block 171a; the data is outputted to D/A converter 55 at block 172; the agitate wave form pointer is incremented at block 173 and inquiry 174 determines whether the end of the agitate wave form table has been reached. If yes, the agitate wave form pointer is reset to the beginning of the table at block 175, the initial value is reloaded into the interrupt timer at block 178 and the program returns to the Timer 0 Interrupt routine at block 164 (FIG. 9). If the end of the agitate wave form table has not been reached, the initial value is reloaded into the interrupt timer at block 178 and the program returns to the Timer 0 Interrupt routine directly from block 174.

If inquiry 170 determines that the mini load bit is not set, then inquiry 176 determines whether the small load bit is set. If yes, data from the small agitate wave form table (Appendix B) is read at block 171b; is outputted to the D/A converter in block 172 and the routine proceeds as previously described. If inquiry 176 determines that the small load bit is not set, block 177 determines whether the medium load bit is set. If yes the data from the medium agitate wave form table (Appendix C) is read at block 171c and is outputted to the D/A converter at block 172. The Agitate Speed routine then continues as previously described. If inquiry 177 determines that the medium load bit has not been set, data from the large load agitate wave form table (Appendix D) is read at block 171d; is outputted to the D/A converter block at 172 and the routine proceeds as previously described.

Figure 15:
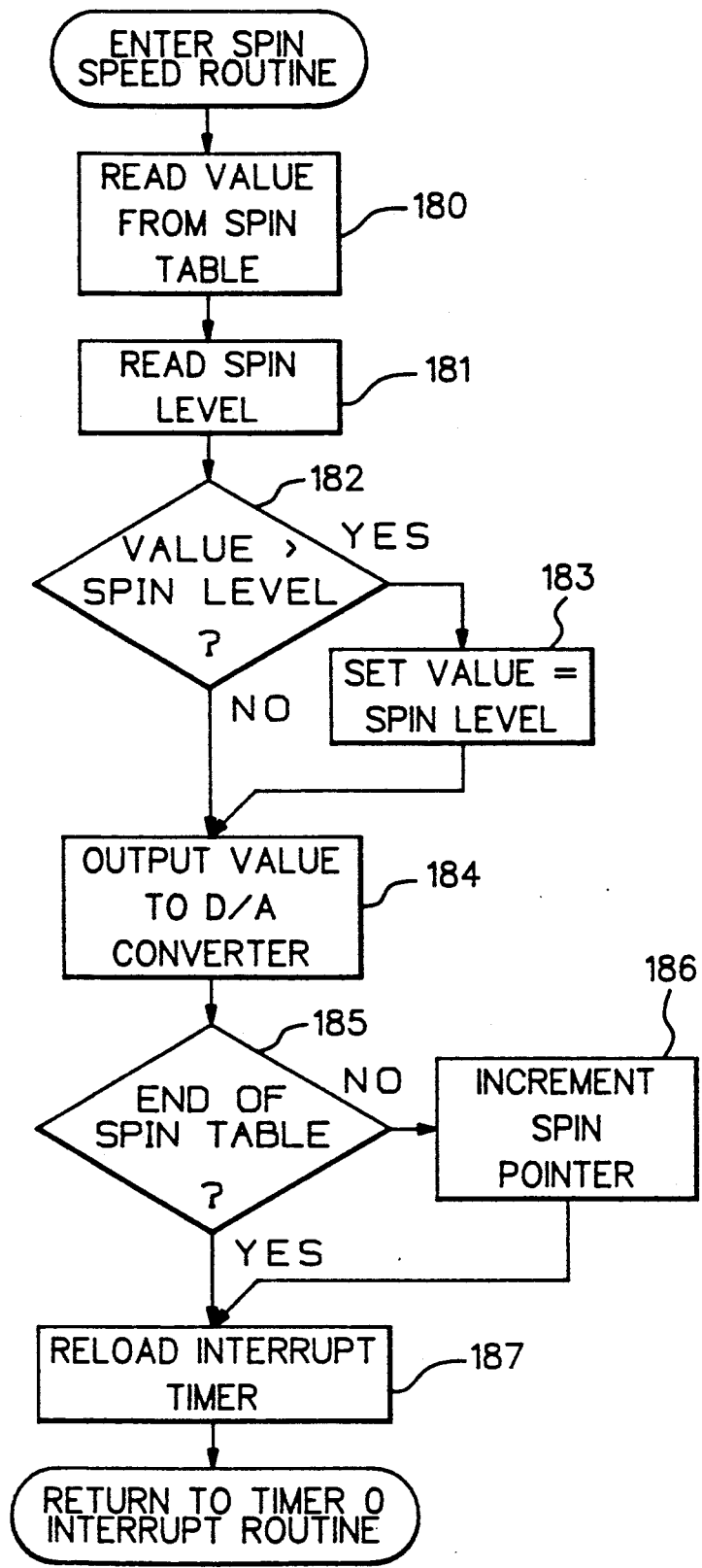
FIG. 15 is a simplified flow diagram of the Spin Speed routine incorporated in the control program of FIG. 4.

When the Spin Speed routine illustrated in FIG. 15 is entered, a value from the spin table is read at block 180 and the user selected maximum spin level is read at block 181. (The maximum spin level is set to conform to the load size at the appropriate box 104a-104d in FIG. 8a.) Inquiry 182 determines whether the value read from the spin table at block 180 is greater than the spin level read at block 181. If yes the spin value is set to equal the spin level at block 183 and this value is outputted to the D/A converter at block 184. If inquiry 182 determines that the value from block 180 is not greater than the spin level from block 181 the spin value, without change, is outputted to the D/A converter. Output of the spin value at block 184 provides a speed control signal to the motor to provide a spin or centrifugal extraction operation. Inquiry 185 determines whether the end of the spin table has been reached. If yes, the initial value is reloaded into the interrupt timer at block 187 and the program returns to the Timer 0 Interrupt routine. If no the spin pointer is incremented at block 186, the initial value is reloaded into the interrupt timer at block 187 and the program then returns to the Timer 0 Interrupt. The dual path from inquiry 182 to block 184 provides a control in which the motor and basket are accelerated up essentially the same curve regardless of the load size but the constant terminal speed varies depending upon the desired speed selected by the user. In the illustrative example this terminal speed is tied to the load size input the user makes by actuating one of the mini, small, medium or large load keypads 20. It will be noted from FIG. 16 that the mini load size terminal speed is the lowest and the large load size terminal speed is the highest. In fact, the large load terminal speed conveniently can be the default terminal speed of the table of predetermined spin values (Appendix E) stored in the microprocessor ROM.

Figure 11:
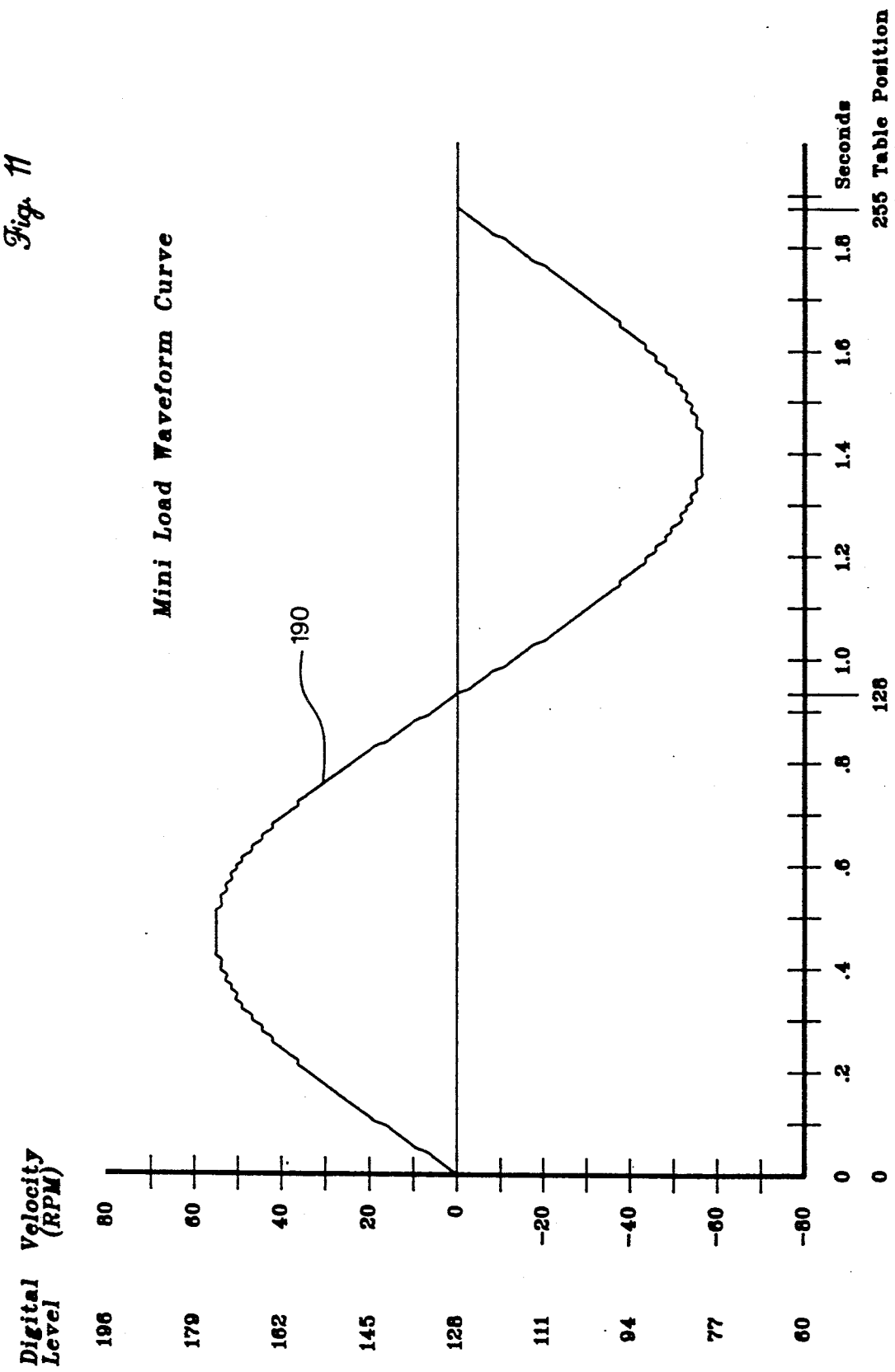
FIG. 11 illustrates an exemplification rotor wave shape for agitation of a mini clothes load.

Referring now to the washer agitate tables, Appendices A-D, inclusive, and to FIGS. 11-14, several aspects of the present invention will become more apparent. FIGS. 11-14 illustrate rotor and basket angular velocities corresponding to the value sets or look up tables of Appendices A-D respectively. In each of FIGS. 11-14 the horizontal axis represents time and the memory look-up table position of particular values. The vertical axis is the velocity in rpm and the direction, with + values corresponding to clockwise and − values corresponding to counterclockwise movement. In addition, the equivalent digital values of the 8 bit bytes stored in the look-up tables and corresponding to velocities are indicated on the vertical axis. Referring particularly to FIG. 11, the velocity curve 190 is essentially sinusoidal, although the curve consists of a discrete number (256) of steps corresponding to the values sequentially called up from the look-up table. In just under half a second the motor and basket reach a peak speed of about 55 rpm in a first, or clockwise, direction. At just over 0.9 seconds the motor and basket decelerate to zero speed. At just under 1.4 seconds the motor and basket accelerate to a peak speed of about 55 rpm in the other, or counterclockwise, direction and at just under 1.9 seconds the motor and basket decelerate to zero angular velocity, finishing one complete stroke.

Figure 12:
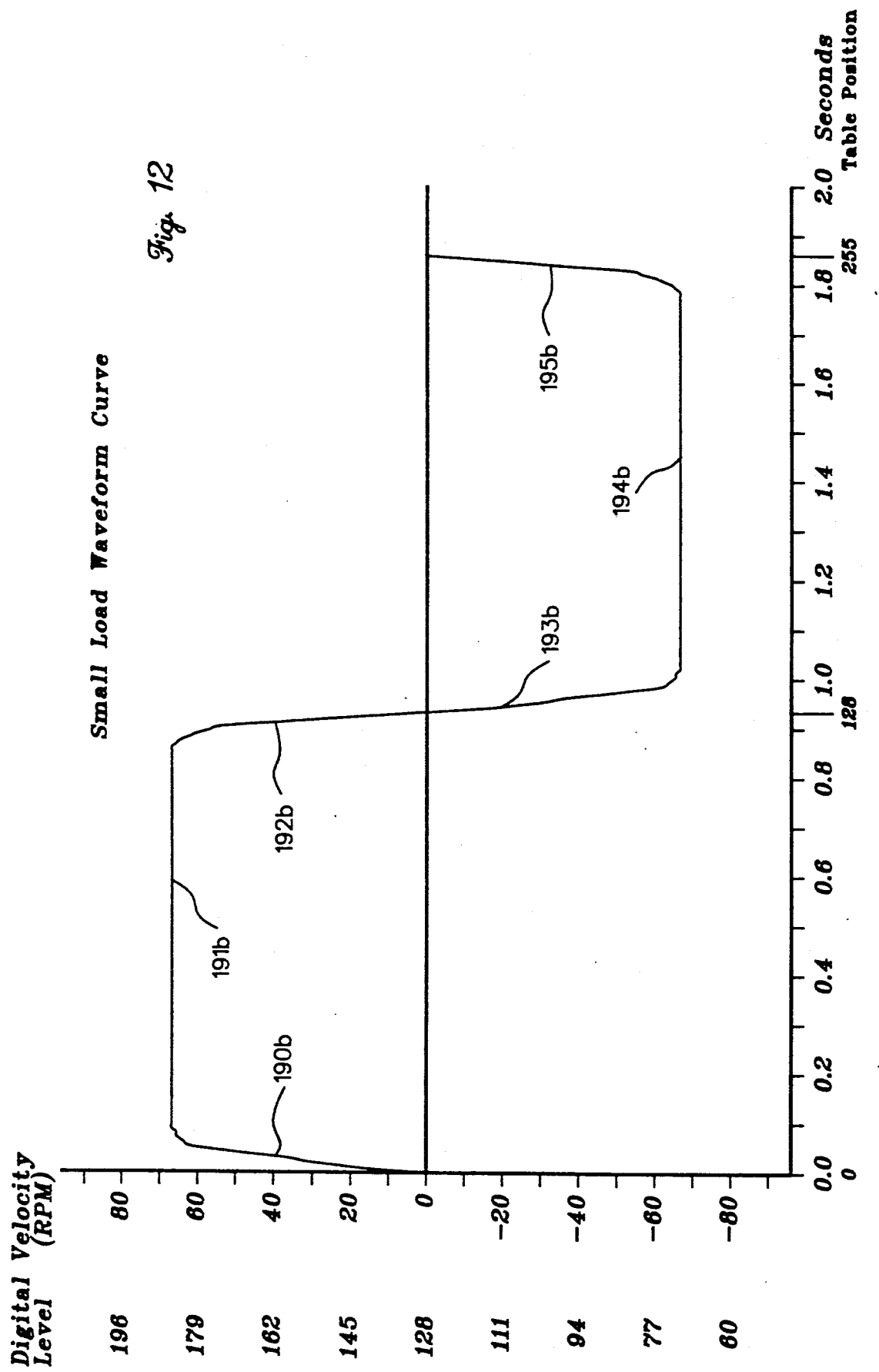
FIG. 12 is an exemplification rotor velocity wave shape for agitation of a small clothes load.

By contrast the exemplification small load wash stroke illustrated in FIG. 12 includes an acceleration in the first direction phase 190b; constant speed in the first direction phase 191b; deceleration in the first direction phase 192b; acceleration in the other direction phase 193b; constant speed in the other direction phase 194b and deceleration in the other or second direction phase 195b.

Mechanical washing action of fabrics occurs when there is relative velocity between the fabrics and basket, or between the fabrics and water (and to the extent there is relative motion between adjacent fabrics). When the basket begins to accelerate, the water and fabrics initially remain stationary. As the basket continues to accelerate, the water and fabrics accelerate with the water velocity lagging the basket velocity and the fabric velocity slightly lagging the water velocity. The water velocity equals the basket velocity a short time after the basket reaches its steady state velocity and the fabric velocity equals the basket velocity after an additional short time. Once the water and fabrics reach the velocity of the basket, minimal mechanical washing of the fabrics occurs so long as the velocity of the basket, water and fabrics remain constant.

During deceleration mechanical washing action takes place in the same manner as in acceleration; that is, as a result of relative motion between the fabrics on the one hand and the basket and water on the other hand. Deceleration uses the energy stored in the system in the form of the steady state velocity of the basket, water and fabrics and therefore there is no need to add energy to the system. In fact, the motor 14 acts as a generator and generates electrical energy which is returned to the power supply system or dissipated as heat. Taking advantage of this fact, in each of the exemplary wash cycles of FIGS. 12-14 the deceleration rate is greater than the corresponding acceleration rate. This causes greater relative motion and greater mechanical washing. This is accomplished with minimum stress on the drive system of the washing machine as it does not have to input energy (torque) to the basket. It will be understood that a lower deceleration rate would result in less relative motion and mechanical washing action even though the same amount of energy is dissipated in going from the steady state velocity to zero velocity.

Mechanical washing action is one major contributor to effectively washing modern fabrics. Another major factor is the chemical action of detergents. The effectiveness of each of these factors varies depending on the types of fabric involved. For example, with an effective minimal detergent concentration, the wash effectiveness (washability) of cotton fabrics varies appreciably with the amount of the mechanical wash action applied. That is, increasing the mechanical action increases washability. However, increasing the detergent concentration does not appreciably increase the washability. On the other hand, with effective minimal mechanical wash action, the washability of synthetic fabrics varies appreciably with the detergent concentration and with time. However, increased mechanical action does not appreciably increase the washability.

A typical load of fabrics currently washed in an automatic washing machine is mixed; that is, it may include some cotton fabrics, some synthetic fabrics and some fabrics which are blends of cotton and synthetic fabrics. Thus, wash cycles need to take into account the varying make-up of the loads that will be washed.

Figure 13:
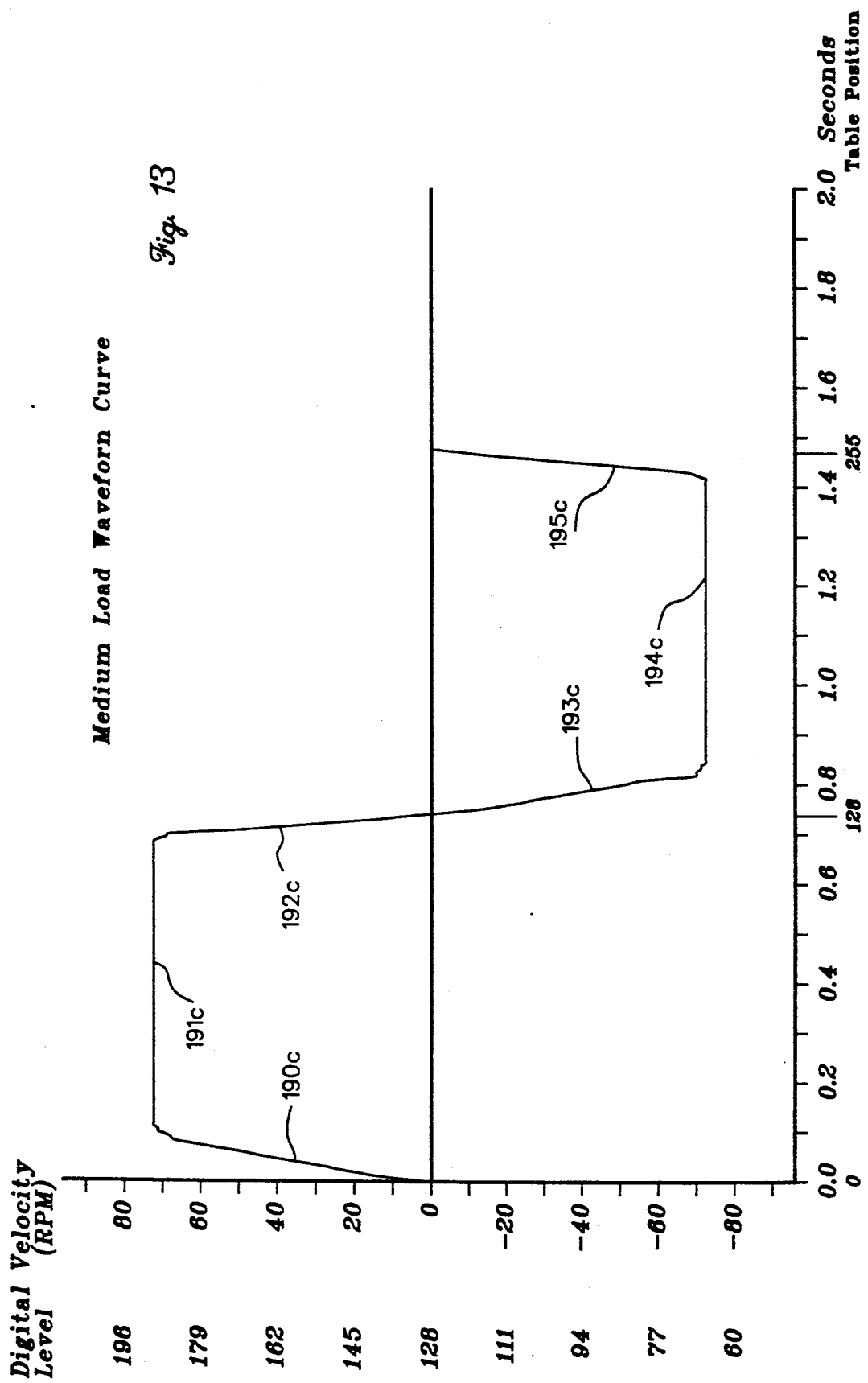
FIG. 13 illustrates an exemplification rotor velocity wave shape for agitation of a medium clothes load.
Figure 14:
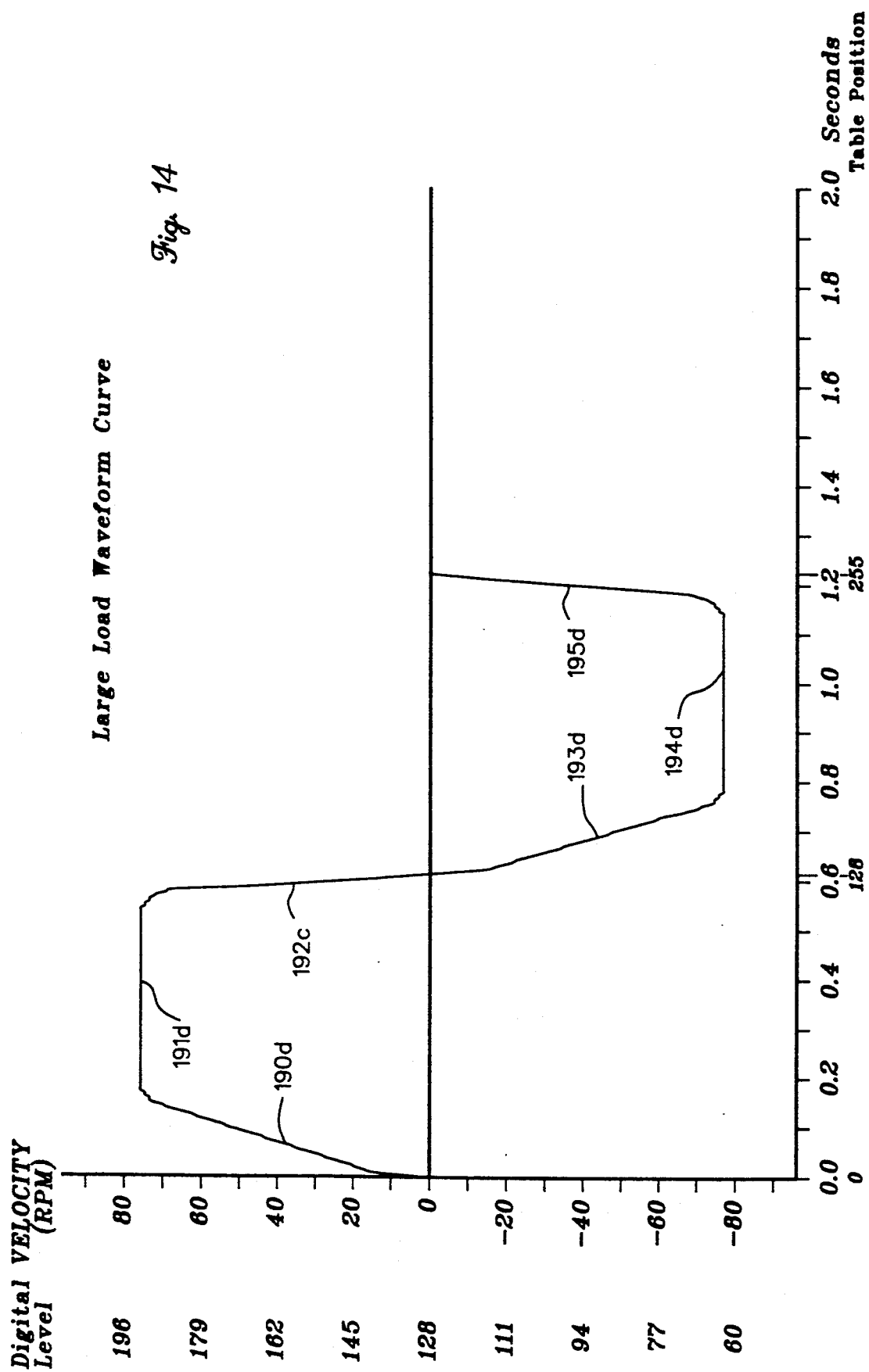
FIG. 14 illustrates an exemplification rotor velocity wave shape for agitation of a large clothes load.

Comparing FIGS. 12, 13 and 14, it will be noted that the acceleration rates, deceleration rates and steady-state velocities are all different depending on the load size. The acceleration rate is highest for small loads, next highest for medium loads and lowest for large loads. With a small load, the water and fabric velocities most quickly catch up with the basket velocity. Consequently, a higher acceleration rate assures adequate continuing mechanical wash action. As the load size increases, continuing mechanical wash action can be assured with a lower acceleration rate. Since energy input is not required for deceleration, it has been maximized for all three exemplification strokes of FIGS. 12-14.

It will be further noted that the steady state velocity is lowest for the small load, higher for the medium load, and highest for the large load. When the maximum velocity is higher, the time of acceleration and deceleration are longer, which results in more mechanical wash action.

The curves of FIGS. 12-14 plot the velocity of the motor rotor and thus the basket. They do not plot the velocities of the water and fabrics. As previously noted, the larger the load the greater the delay in the water and fabrics reaching the steady state velocity of the basket. Consequently, the basket (motor) steady state phases (191d and 194d in FIG. 14) for a large load should be long enough for the water and fabric velocities to reach the basket steady state velocity before motor deceleration begins.

At least from a mechanical washing action standpoint the steady state velocity phases (191c and 194c in FIG. 13) for a medium load can be shorter than the steady state velocity phases for a large load and the steady state velocity phases (191b and 194b of FIG. 12) for a small load can be even shorter. However, it will be noted that, in the exemplification strokes of FIGS. 12-14, the reverse relationship is illustrated; that is, the steady state velocity phases for a small load are the longest. This provides sufficient time for appropriate chemical action and takes into account the currently commercially preferred practice of having the wash cycle be of a uniform length regardless of the load size.

Assuming that the wash cycle has a uniform length, for example fifteen minutes, the number of small load strokes (FIG. 12) will be fewest and the number of large load strokes (FIG. 14) will be greatest. Since there is minimal mechanical wash action at steady state velocity, the long steady state velocity phases (191b and 194b) for the small load do not provide unneeded mechanical washing at the price of unnecessary wear of the fabrics.

Of course, if it is desired to have the length of the wash cycle vary with the load size, then the steady state velocity phases can be shortened as the load size decreases. In that case, for best results the water and fabric velocities should reach the basket steady state velocity before deceleration begins and sufficient time should be allotted to the wash cycle for each load size to provide appropriate mechanical and chemical wash action.

It will be noted from Appendices A-D that one stroke for each load size uses 256 (0-255) table positions or call ups of individual values. However, one stroke for the small load requires almost 1.9 seconds, one stroke for the medium load requires just under 1.5 seconds and one stroke for the large load requires just over 1.2 seconds. Thus it is clear that the periods between call ups or the frequency of call up varies from load size to load size. While the acceleration and deceleration phases look somewhat similar in the drawings, the slopes are considerably different. A comparison of the load tables of Appendices B, C and D show that they are independent and, in many ways, asymmetric. For example, comparing the initial portions of the value tables, in the small load table there are 11 values between the initial 128 and the maximum speed value of 187; there are 107 repetitions of the value 187 and there are 9 values between the last 187 and the next 128. In the medium load curve there are 18 values between the first 128 and the maximum speed value of 192; there are 99 repeats of the value 192 and there are 9 values between the last 192 and the next value 128. In the large load curve there are 35 values between the initial 128 and the maximum velocity value 195; there are 77 repeats of the value 195 and there are 14 values between the last 195 and the next 128 value. In summary, the stroke curves have a different number of values in the acceleration phase (11, 18 and 35 respectively); a different number of repeats of the maximum speed value (107, 99, 77 respectively) and a different number of values in the deceleration phase (9, 9, and 14 respectively). Also the maximum velocity value varies with load size, with the small load value being lowest (187), the medium load value being next (192) and the large load value being highest (195). A comparison of the load tables will show that the incremental changes in speed in the acceleration phases or in the deceleration phases of strokes for different load sizes as well as between the acceleration and deceleration phases of the same stroke are asymmetric.

Two portions of the velocity profiles of the illustrative strokes of FIGS. 12-14 are optimized for reliability of the electronic control. Acceleration is decreased in steps as the steady state velocity is approached rather than abruptly shifting from acceleration to steady state operation. Second, the velocity profile very rapidly transitions from deceleration to acceleration. That is, it passes through the zero motor speed value of 128 with a very high rate of change.

The illustrative embodiments of this invention illustrated and described herein incorporate a control which uses empirically determined values called up in a predetermined timed sequence to control a switched reluctance motor that directly drives an oscillating basket washing machine. However, it will be apparent that various aspects of this invention have broader application. For example certain aspects of the invention are applicable to washing machines having other motors, particularly other types of electronically commutated motors. Also various aspects of this invention are applicable to washing machines which have separate agitators or means other than an oscillating basket to impart agitation motion and energy to the fabrics and fluid. It will be apparent to those skilled in the art that, while I have described what I presently consider to be the preferred embodiments of my invention in accordance with the patent statutes, changes may be made in the disclosed embodiments without departing from the true spirit and scope of the invention.

APPENDIX A

Mini Load Digital Waveform

| 128 | 129 | 130 | 131 | 132 | 133 | 134 | 136 | 137 | 138 | 139 | 140 | 141 | 142 | 144 | 145 |
|---|---|---|---|---|---|---|---|---|---|---|---|---|---|---|---|
| 146 | 147 | 148 | 149 | 150 | 151 | 152 | 153 | 154 | 155 | 156 | 157 | 158 | 159 | 159 | 160 |
| 161 | 162 | 163 | 164 | 164 | 165 | 166 | 166 | 167 | 168 | 168 | 169 | 170 | 170 | 171 | 171 |
| 171 | 172 | 172 | 173 | 173 | 173 | 174 | 174 | 174 | 174 | 175 | 175 | 175 | 175 | 175 | 175 |
| 175 | 175 | 175 | 175 | 175 | 175 | 174 | 174 | 174 | 174 | 174 | 173 | 173 | 173 | 172 | 172 |
| 172 | 171 | 171 | 170 | 170 | 169 | 168 | 168 | 167 | 166 | 166 | 165 | 164 | 164 | 163 | 162 |
| 161 | 160 | 159 | 159 | 158 | 157 | 156 | 155 | 154 | 153 | 152 | 151 | 150 | 149 | 148 | 147 |
| 146 | 145 | 144 | 142 | 141 | 140 | 139 | 138 | 137 | 136 | 134 | 133 | 132 | 131 | 130 | 129 |
| 128 | 126 | 125 | 124 | 123 | 122 | 121 | 119 | 118 | 117 | 116 | 115 | 114 | 113 | 111 | 110 |
| 109 | 108 | 107 | 106 | 105 | 104 | 103 | 102 | 101 | 100 | 99 | 98 | 97 | 96 | 96 | 95 |
| 94 | 93 | 92 | 91 | 91 | 90 | 89 | 89 | 88 | 87 | 87 | 86 | 86 | 85 | 84 | 84 |
| 84 | 83 | 83 | 82 | 82 | 82 | 81 | 81 | 81 | 81 | 80 | 80 | 80 | 80 | 80 | 80 |
| 80 | 80 | 80 | 80 | 80 | 80 | 80 | 81 | 81 | 81 | 81 | 82 | 82 | 82 | 83 | 83 |
| 83 | 84 | 84 | 85 | 85 | 86 | 87 | 87 | 88 | 89 | 89 | 90 | 91 | 91 | 92 | 93 |
| 94 | 95 | 96 | 96 | 97 | 98 | 99 | 100 | 101 | 102 | 103 | 104 | 105 | 106 | 107 | 108 |
| 109 | 110 | 111 | 113 | 114 | 115 | 116 | 117 | 118 | 119 | 121 | 122 | 123 | 124 | 125 | 126 |

APPENDIX B

Small Load Digital Waveform

| 128 | 141 | 149 | 156 | 160 | 168 | 175 | 182 | 184 | 185 | 186 | 186 | 187 | 187 | 187 | 187 |
|---|---|---|---|---|---|---|---|---|---|---|---|---|---|---|---|
| 187 | 187 | 187 | 187 | 187 | 187 | 187 | 187 | 187 | 187 | 187 | 187 | 187 | 187 | 187 | 187 |
| 187 | 187 | 187 | 187 | 187 | 187 | 187 | 187 | 187 | 187 | 187 | 187 | 187 | 187 | 187 | 187 |
| 187 | 187 | 187 | 187 | 187 | 187 | 187 | 187 | 187 | 187 | 187 | 187 | 187 | 187 | 187 | 187 |
| 187 | 187 | 187 | 187 | 187 | 187 | 187 | 187 | 187 | 187 | 187 | 187 | 187 | 187 | 187 | 187 |
| 187 | 187 | 187 | 187 | 187 | 187 | 187 | 187 | 187 | 187 | 187 | 187 | 187 | 187 | 187 | 187 |
| 187 | 187 | 187 | 187 | 187 | 187 | 187 | 187 | 187 | 187 | 187 | 187 | 187 | 187 | 187 | 187 |
| 187 | 187 | 187 | 187 | 187 | 187 | 187 | 186 | 185 | 183 | 181 | 178 | 175 | 163 | 152 | 140 |
| 128 | 115 | 107 | 100 | 96 | 88 | 81 | 74 | 72 | 71 | 70 | 70 | 69 | 69 | 69 | 69 |
| 69 | 69 | 69 | 69 | 69 | 69 | 69 | 69 | 69 | 69 | 69 | 69 | 69 | 69 | 69 | 69 |
| 69 | 69 | 69 | 69 | 69 | 69 | 69 | 69 | 69 | 69 | 69 | 69 | 69 | 69 | 69 | 69 |
| 69 | 69 | 69 | 69 | 69 | 69 | 69 | 69 | 69 | 69 | 69 | 69 | 69 | 69 | 69 | 69 |
| 69 | 69 | 69 | 69 | 69 | 69 | 69 | 69 | 69 | 69 | 69 | 69 | 69 | 69 | 69 | 69 |
| 69 | 69 | 69 | 69 | 69 | 69 | 69 | 69 | 69 | 69 | 69 | 69 | 69 | 69 | 69 | 69 |
| 69 | 69 | 69 | 69 | 69 | 69 | 69 | 69 | 69 | 69 | 69 | 69 | 69 | 69 | 69 | 69 |
| 69 | 69 | 69 | 69 | 69 | 69 | 70 | 71 | 73 | 75 | 78 | 81 | 93 | 104 | 116 | 128 |

APPENDIX C

Medium Load Digital Waveform

| 128 | 135 | 141 | 145 | 149 | 152 | 156 | 160 | 164 | 168 | 171 | 175 | 179 | 183 | 187 | 188 |
|---|---|---|---|---|---|---|---|---|---|---|---|---|---|---|---|
| 189 | 191 | 191 | 192 | 192 | 192 | 192 | 192 | 192 | 192 | 192 | 192 | 192 | 192 | 192 | 192 |
| 192 | 192 | 192 | 192 | 192 | 192 | 192 | 192 | 192 | 192 | 192 | 192 | 192 | 192 | 192 | 192 |
| 192 | 192 | 192 | 192 | 192 | 192 | 192 | 192 | 192 | 192 | 192 | 192 | 192 | 192 | 192 | 192 |
| 192 | 192 | 192 | 192 | 192 | 192 | 192 | 192 | 192 | 192 | 192 | 192 | 192 | 192 | 192 | 192 |
| 192 | 192 | 192 | 192 | 192 | 192 | 192 | 192 | 192 | 192 | 192 | 192 | 192 | 192 | 192 | 192 |
| 192 | 192 | 192 | 192 | 192 | 192 | 192 | 192 | 192 | 192 | 192 | 192 | 192 | 192 | 192 | 192 |
| 192 | 192 | 192 | 192 | 192 | 192 | 191 | 189 | 187 | 174 | 165 | 157 | 149 | 141 | 135 | 128 |
| 121 | 115 | 111 | 107 | 104 | 100 | 96 | 92 | 88 | 84 | 81 | 77 | 68 | 66 | 66 | 65 |
| 65 | 64 | 64 | 64 | 64 | 64 | 64 | 64 | 64 | 64 | 64 | 64 | 64 | 64 | 64 | 64 |
| 64 | 64 | 64 | 64 | 64 | 64 | 64 | 64 | 64 | 64 | 64 | 64 | 64 | 64 | 64 | 64 |
| 64 | 64 | 64 | 64 | 64 | 64 | 64 | 64 | 64 | 64 | 64 | 64 | 64 | 64 | 64 | 64 |
| 64 | 64 | 64 | 64 | 64 | 64 | 64 | 64 | 64 | 64 | 64 | 64 | 64 | 64 | 64 | 64 |
| 64 | 64 | 64 | 64 | 64 | 64 | 64 | 64 | 64 | 64 | 64 | 64 | 64 | 64 | 64 | 64 |
| 64 | 64 | 64 | 64 | 64 | 64 | 64 | 64 | 64 | 64 | 64 | 64 | 64 | 64 | 64 | 64 |
| 64 | 64 | 64 | 64 | 64 | 64 | 66 | 68 | 74 | 82 | 90 | 99 | 107 | 115 | 121 | 128 |

APPENDIX D

Large Load Digital Waveform

| 128 | 135 | 141 | 143 | 145 | 146 | 148 | 150 | 152 | 153 | 155 | 157 | 159 | 160 | 162 | 164 |
|---|---|---|---|---|---|---|---|---|---|---|---|---|---|---|---|

-continued

| 166 | 167 | 169 | 171 | 173 | 175 | 176 | 178 | 180 | 182 | 183 | 185 | 187 | 189 | 190 | 192 |
|---|---|---|---|---|---|---|---|---|---|---|---|---|---|---|---|
| 193 | 193 | 194 | 194 | 195 | 195 | 195 | 195 | 195 | 195 | 195 | 195 | 195 | 195 | 195 | 195 |
| 195 | 195 | 195 | 195 | 195 | 195 | 195 | 195 | 195 | 195 | 195 | 195 | 195 | 195 | 195 | 195 |
| 195 | 195 | 195 | 195 | 195 | 195 | 195 | 195 | 195 | 195 | 195 | 195 | 195 | 195 | 195 | 195 |
| 195 | 195 | 195 | 195 | 195 | 195 | 195 | 195 | 195 | 195 | 195 | 195 | 195 | 195 | 195 | 195 |
| 195 | 195 | 195 | 195 | 195 | 195 | 195 | 195 | 195 | 195 | 195 | 195 | 195 | 195 | 195 | 195 |
| 195 | 195 | 194 | 194 | 193 | 193 | 192 | 191 | 189 | 187 | 174 | 165 | 157 | 149 | 141 | 135 |
| 128 | 121 | 115 | 113 | 111 | 109 | 108 | 106 | 104 | 102 | 100 | 98 | 97 | 95 | 93 | 91 |
| 89 | 87 | 86 | 84 | 82 | 80 | 78 | 76 | 75 | 73 | 70 | 68 | 66 | 65 | 63 | 62 |
| 62 | 61 | 61 | 60 | 60 | 60 | 60 | 60 | 60 | 60 | 60 | 60 | 60 | 60 | 60 | 60 |
| 60 | 60 | 60 | 60 | 60 | 60 | 60 | 60 | 60 | 60 | 60 | 60 | 60 | 60 | 60 | 60 |
| 60 | 60 | 60 | 60 | 60 | 60 | 60 | 60 | 60 | 60 | 60 | 60 | 60 | 60 | 60 | 60 |
| 60 | 60 | 60 | 60 | 60 | 60 | 60 | 60 | 60 | 60 | 60 | 60 | 60 | 60 | 60 | 60 |
| 60 | 60 | 60 | 60 | 60 | 60 | 60 | 60 | 60 | 60 | 60 | 60 | 60 | 60 | 60 | 60 |
| 61 | 61 | 62 | 62 | 63 | 64 | 66 | 68 | 74 | 82 | 90 | 99 | 107 | 115 | 121 | 128 |

APPENDIX E

Spin Table

| 128 | 128 | 129 | 129 | 130 | 130 | 131 | 131 | 132 | 132 | 133 | 133 | 134 | 134 | 135 | 135 |
|---|---|---|---|---|---|---|---|---|---|---|---|---|---|---|---|
| 136 | 136 | 137 | 137 | 138 | 138 | 139 | 139 | 140 | 140 | 141 | 141 | 142 | 142 | 143 | 143 |
| 144 | 144 | 145 | 145 | 146 | 146 | 147 | 147 | 148 | 148 | 149 | 149 | 150 | 150 | 151 | 151 |
| 152 | 152 | 153 | 153 | 154 | 154 | 155 | 155 | 156 | 156 | 157 | 157 | 158 | 158 | 159 | 159 |
| 160 | 160 | 161 | 161 | 162 | 162 | 163 | 163 | 164 | 164 | 165 | 165 | 166 | 166 | 167 | 167 |
| 168 | 168 | 169 | 169 | 170 | 170 | 171 | 171 | 172 | 172 | 173 | 173 | 174 | 174 | 175 | 175 |
| 176 | 176 | 177 | 177 | 178 | 178 | 179 | 179 | 180 | 180 | 181 | 181 | 182 | 182 | 183 | 183 |
| 184 | 184 | 185 | 185 | 186 | 186 | 187 | 187 | 188 | 188 | 189 | 189 | 190 | 190 | 191 | 191 |
| 192 | 192 | 193 | 193 | 194 | 194 | 195 | 195 | 196 | 196 | 197 | 197 | 198 | 198 | 199 | 199 |
| 200 | 200 | 201 | 201 | 202 | 202 | 203 | 203 | 204 | 204 | 205 | 205 | 206 | 206 | 207 | 207 |
| 208 | 208 | 209 | 209 | 210 | 210 | 211 | 211 | 212 | 212 | 213 | 213 | 214 | 214 | 215 | 215 |
| 216 | 216 | 217 | 217 | 218 | 218 | 219 | 219 | 220 | 220 | 221 | 221 | 222 | 222 | 223 | 223 |
| 224 | 224 | 225 | 225 | 226 | 226 | 227 | 227 | 228 | 228 | 229 | 229 | 230 | 230 | 231 | 231 |
| 232 | 232 | 233 | 233 | 234 | 234 | 235 | 235 | 236 | 236 | 237 | 237 | 238 | 238 | 239 | 239 |
| 240 | 240 | 241 | 241 | 242 | 242 | 243 | 243 | 244 | 244 | 245 | 245 | 246 | 246 | 247 | 247 |
| 248 | 248 | 249 | 249 | 250 | 250 | 251 | 251 | 252 | 252 | 253 | 253 | 254 | 254 | 255 | 255 |

What we claim as new and desire to secure by Letters Patent of the United States is:

1. A fabric washing machine comprising:
    a wash container adapted to receive fluid and fabrics to be washed in the fluid, said container being operable in a washing mode for agitating the fluid and fabrics to be washed therein and thereafter operable in a spin mode for centrifugally extracting fluid from the fabrics;
    an electronically commutated motor drivingly connected to said wash container for operation of said container in its wash and spin modes;
    signal generation means effective to provide a timed series of predetermined signals each of which is representative of a corresponding velocity of said motor; and
    motor control means connected to receive the signals and effective to control said motor for operation substantially at a velocity corresponding to the then current signal.

2. A drive for a laundry machine having means for agitating fluid and fabrics therein to launder the fabrics and thereafter for spinning the fabrics to centrifugally extract fluid from the fabrics, said drive comprising:
    an electrically energizable motor drivingly connected to said means for agitating and for spinning;
    wash control means effective to provide a timed series of predetermined signals each of said signals having a value representative of a corresponding velocity of said motor; and
    motor control means connected to receive the signals and effective to control said motor for operation at a velocity substantially corresponding to the then current signal.

3. The drive as set forth in claim 2 wherein: the value of each signal is independent of the values of other signals.

4. The drive as set forth in claim 2 wherein the values of said signals re independent of any measured motor operation value.

5. A fabric washing machine comprising agitation means adapted to contact fabrics to be washed and oscillatable in forward and reverse directions to agitate the fluid and fabrics;
    a motor operatively connected to said agitation means; and
    operation control means operatively connected to said motor;
    said operation control means including memory means for storing at least one set of empirically determined values representative of corresponding angular motor velocities defining at least one wash stroke of said agitation means;
    said operation control means being operative to call up individual values from said memory means in a predetermined timed sequence and to cause said motor to operate in accordance with the then called up value.

6. A fabric washing machine as set forth in claim 5 further comprising:
    means effective to vary the time lapse between successive call ups of values.

7. A fabric washing machine as set forth in claim 5, wherein:
    said memory means is effective to store and said operation control means is operative to selectively call up values of at least two sets of empirically determined values representative of desired instantaneous motor velocities; and each set of values is independent of any other set of values so that the wash stroke associated with a particular set of values is independent of other wash strokes.

8. A fabric washing machine as set forth in claim 7, further comprising:
user operable means effective to select the particular set of values for call up by said operation control means.

9. A fabric washing machine as set forth in claim 7, wherein:
said operation control means further includes timer means effective to establish the time period between successive call ups of values in each set of values independent of the time period between successive call ups of values in any other set.

10. A fabric washing machine as set forth in claim 9, further comprising:
user operable means effective to select the particular time period between successive call ups.

11. A fabric washing machine as set forth in claim 9 wherein the time period between successive call ups of values in one set of values is different than the time period between successive call ups of values in another of said sets of values so that the stroke rate of said agitation means associated with one set of values is different than the stroke rate associated with another of said sets of values.

12. A fabric washing machine as set forth in claim 7 wherein each set of values establishes a multi-phase agitation means wash stroke including at least an acceleration phase and a deceleration phase and the sequence of values for an acceleration phase is asymmetric relative to the sequence of values for the deceleration phase of the same set of values, so that the acceleration and deceleration of said agitation means in a particular wash stroke are asymmetric.

13. A fabric washing machine as set forth in claim 5, wherein:
said at least one set of empirically determined values establishes a multi-phase wash stroke of said agitation means and the values corresponding to each wash stroke phase are independent of the values corresponding to other wash stroke phases.

14. A fabric washing machine as set forth in claim 13, wherein:
said at least one set of empirically determined values establishes a multi-phase agitation mans wash stroke including at least an acceleration phase and a deceleration phase with the sequence of said values for the acceleration phase being asymmetric relative to the sequence of said values for the deceleration phase.

15. A fabric washing machine as set forth in claim 13, wherein:
said at least one set of empirically determined values establishes an agitation means wash stroke including an acceleration phase, a steady state velocity phase and a deceleration phase.

16. A fabric washing machine as set forth in claim 5, wherein:
said at least one set of empirically determined values establish a multi-phase wash stroke oscillation of said agitation means including at least acceleration in the forward direction, deceleration in the forward direction, acceleration in the reverse direction and deceleration in the reverse direction of agitation means oscillation; and
wherein the values corresponding to each wash stroke phase are independent of the values corresponding to other wash stroke phases.

17. A fabric washing machine as set forth in claim 16, wherein:
the sequence of values corresponding to a particular acceleration phase is asymmetric relative to the sequence of values corresponding to the deceleration phase in the same direction.

18. A fabric washing machine as set forth in claim 5, wherein said at least one set of empirically determined values establishes a multi-phase wash stroke oscillation of said agitation means; including acceleration in the forward direction, steady state velocity in the forward direction, deceleration in the forward direction, acceleration in the reverse direction, steady state velocity in the reverse direction and deceleration in the reverse direction of agitation means oscillation.

19. A fabric washing machine comprising:
agitation means adapted to contact fabrics to be washed and oscillatable in forward and reverse directions to agitate the fluid and fabrics;
an electronically commutated motor having a stator and a rotor, said rotor being oscillatable in forward and reverse directions;
drive means directly connecting said motor rotor to said agitation means for oscillating said agitation means in the same instantaneous direction and at substantially the same angular velocity as said rotor; and
operation control means operatively connected to said motor;
said operation control means including memory means for storing at least one set of empirically determined values representative of corresponding angular rotor velocities defining at least one wash stroke of said agitation means;
said operation control means being operative to call up individual values from said memory means in a predetermined timed sequence and to cause said rotor to operate in accordance with the then called up value.

20. A fabric washing machine as set forth in claim 19 further comprising:
means effective to vary the time lapse between successive call ups of values.

21. A fabric washing machine as set forth in claim 19, wherein:
said memory means is effective to store and said operation control means is operative to selectively call up values of at least two sets of empirically determined values representative of desired instantaneous rotor velocities, each set of values being independent of any other set of values so that the wash stroke associated with a particular set of values is independent of other wash strokes.

22. A fabric washing machine as set forth in claim 21, further comprising:
user operable means effective to select the set of values for call up by said operation control means.

23. A fabric washing machine as set forth in claim 21 wherein each set of values establishes a multi-phase agitation means wash stroke including at least an acceleration phase and a deceleration phase and the sequence of values for an acceleration phase is asymmetric relative to the sequence of values for the deceleration phase of the same set of values, so that the said agitation means acceleration and deceleration in a particular wash stroke are asymmetric.

24. A fabric washing machine as set forth in claim 21, wherein:
said operation control means further includes timer means effective to establish the time period between successive call ups of values in each set of values independent of the time period between successive call ups of values in another set.

25. A fabric washing machine as set forth in claim 24 wherein the time period between successive call ups of values in one set of values is different than the time period between successive call ups of values in another of said sets of values so that the stroke rate of said agitation means associated with one set of values is different than the stroke rate associated with another of said sets of values.

26. A fabric washing machine as set forth in claim 19, wherein:
said at least one set of empirically determined values establishes a multi-phase wash stroke of said agitation means in at least one of the forward and reverse directions including at least an acceleration phase and a deceleration phase with the sequence of values for the acceleration phase being asymmetric relative to the sequence of values for the deceleration phase.

27. A fabric washing machine as set forth in claim 19 wherein:
said at least one set of empirically determined values establishes a multi-phase wash stroke oscillation of said agitation means including acceleration in the forward direction, steady state velocity in the forward direction, deceleration in the forward direction, acceleration in the reverse direction steady state velocity in the reverse direction and deceleration in the reverse direction; and
the sequence of values for the acceleration phase in one direction is asymmetric relative to the sequence of values for the deceleration phase in the same direction.

28. A fabric washing machine comprising:
agitation means adapted to contact fabrics to be washed and oscillatable in forward and reverse directions to agitate the fabrics;
a switched reluctance motor having a stator and a rotor, said rotor being oscillatable in forward and reverse directions;
drive means directly connecting said motor rotor to said agitation means for oscillating said agitation means in the same instantaneous direction and at substantially the same angular velocity as said rotor; and
operation control means operatively connected to said motor;
said operation control means including memory means for storing at least one set of empirically determined values representative of corresponding angular rotor velocities defining at least one wash stroke of said agitation means;
said operation control means being operative to call up individual values from said memory means in a predetermined timed sequence and to cause said rotor to operate in accordance with the then called up value.

29. A fabric washing machine as set forth in claim 28 further comprising:
means effective to vary the time lapse between the call up of successive values.

30. A fabric washing machine as set forth in claim 28, wherein:
said memory means is effective to store and said operation control means is operative to selectively call up values of at least two sets of empirically determined values representative of desired instantaneous rotor velocities, each set of values being independent of any other set of values so that the wash stroke associated with a particular set of values is independent of other wash strokes.

31. A fabric washing machine as set forth in claim 30, further comprising:
user operable means effective to select the set of values for call up by said operation control means.

32. A fabric washing machine as set forth in claim 30, wherein:
said operation control means further includes timer means effective to establish the time period between successive call ups of values in each set of values independent of the time period between successive call ups of values in another set.

33. A fabric washing machine as set forth in claim 32 wherein the time period between successive call ups of values in one set of values is different than the time period between successive call ups of values in another of said sets of values so that the stroke rate of said agitation means associated with one set of values is different than the stroke rate associated with another of said sets of values.

34. A fabric washing machine as set forth in 28, wherein:
said at least one set of empirically determined values establishes a multi-phase wash stroke of said agitation means in at least one of the forward and reverse directions including at least an acceleration phase and a deceleration phase with the sequence of values for the acceleration phase is asymmetric relative to the sequence of values for the deceleration phase.

35. A fabric washing machine as set forth in claim 28 wherein:
said at least one set of empirically determined values establishes a multi-phase wash stroke oscillation of said agitation means including acceleration in the forward direction, steady state velocity in the forward direction, deceleration in the forward direction, acceleration in the reverse direction steady state velocity in the reverse direction and deceleration in the reverse direction; and
the sequence of values for the acceleration phase in one direction is asymmetric relative to the sequence of values for the deceleration phase in the same direction.

36. A fabric washing machine comprising:
a wash container adapted to receive fluid and fabrics to be washed in the fluid, said container being oscillatable in forward and reverse directions to agitate the fluid and fabrics;
a switched reluctance motor having a stator and a rotor, said rotor being oscillatable in forward and reverse directions;
drive means directly connecting said rotor to said container for oscillating said container in the same instantaneous direction and at substantially the same arcuate speed as said rotor; and operation control means operatively connected to said motor;

said operation control means including memory means for storing at least one set of empirically determined values representative of corresponding angular rotor velocities defining at least one wash stroke of said container;

said operation control means being operative to call up individual values from said memory means in a predetermined timed sequence and to cause said rotor to operate in accordance with the then called up value.

37. A fabric washing machine as set forth in claim 36 further comprising:

means effective to vary the time lapse between successive call ups of values.

38. A fabric washing machine as set forth in claim 36, wherein:

said memory means is effective to store and said operation control means is operative to selectively call up values of at least two sets of empirically determined values representative of desired instantaneous rotor velocities; and each set of values is independent of any other set of values so that the wash stroke associated with a particular set of values is independent of other wash strokes.

39. A fabric washing machine as set forth in claim 38, further comprising:

user operable means effective to select the particular set of values for call up by said operation control means.

40. A fabric washing machine as set forth in claim 38, wherein:

said operation control means further includes timer means effective to establish the time period between successive call ups of values in each set of values independent of the time period between successive call ups of values in any other set.

41. A fabric washing machine as set forth in claim 40, further comprising:

user operable means effective to select the particular time period between successive call ups.

42. A fabric washing machine as set forth in claim 40 wherein the time period between successive call ups of values in one set of values is different than the time period between successive call ups of values in another of said sets of values so that the stroke rate of said agitation means associated with one set of values is different than the stroke rate associated with another of said sets of values.

43. A fabric washing machine as set forth in claim 38 wherein each set of values establishes a multi-phase agitation means wash stroke including at least an acceleration phase and a deceleration phase and the sequence of values for an acceleration phase is asymmetric relative to the sequence of values for the deceleration phase of the same set of values, so that acceleration and deceleration of said wash container in a particular oscillation are asymmetric.

44. A fabric washing machine as set forth in claim 36, wherein:

said at least one set of empirically determined values establishes a multi-phase oscillation of said wash container with the values corresponding to each oscillation phase being independent of the values corresponding to other oscillation phases.

45. A fabric washing machine as set forth in claim 44, wherein:

said at least one set of empirically determined values establishes a multi-phase wash container oscillation including at least an acceleration phase and a deceleration phase with the sequence of values for the acceleration phase being asymmetric relative to the sequence of said values for the deceleration phase.

46. A fabric washing machine as set forth in claim 44, wherein:

said at least one set of empirically determined values establishes a multi-phase wash container oscillation including an acceleration phase, a steady state velocity phase and a deceleration phase.

47. A fabric washing machine as set forth in claim 36, wherein:

said at least one set of empirically determined values establishes a multi-phase oscillation of said wash container including at least acceleration in the forward direction, deceleration in the forward direction, acceleration in the reverse direction and deceleration in the reverse direction; and wherein the values corresponding to each oscillation phase are independent of the values corresponding to other oscillation phases.

48. A fabric washing machine as set forth in claim 47, wherein:

the sequence of values corresponding to a particular acceleration phase is asymmetric relative to the sequence of values corresponding to the deceleration phase in the same direction.

49. A fabric washing machine as set forth in claim 36, wherein said at least one set of empirically determined values establishes a multi-phase oscillation of said wash container; said oscillation phases include acceleration in the forward direction, steady state velocity in the forward direction, deceleration in the forward direction, acceleration in the reverse direction, steady state velocity in the reverse direction and deceleration in the reverse direction of wash container oscillation.

50. A fabric washing machine comprising:

a wash container adapted to receive fluid and fabrics to be washed in the fluid, said container being rotatable for centrifugally extracting fluid from the fabrics;

an electrically energizable motor drivingly connected to said wash container;

operation control means operatively connected to said motor, said control means including memory means for storing at least one set of empirically determined values representative of desired instantaneous angular motor velocities, said operation control means being operative to call up individual values in a predetermined sequence to provide an extraction operation including acceleration and constant angular velocity rotation of said motor.

51. A fabric washing machine as set forth in claim 50 wherein:

said electrically energizable motor is an electronically commutated motor.

52. A fabric washing machine, as set forth in claim 50 wherein said electrically energizable motor is a switched reluctance motor.

53. A fabric washing machine as set forth in claim 50 further comprising:

user operable means for selectively providing at least one value of a desired maximum angular motor velocity less than the constant angular velocity provided in accordance with the at least one stored set of values, and wherein said operation control means is operative to compare the value called up from the at least one set of values with the value provided by said user operable means and to control motor operation in accordance with the compared value representative of the lower velocity.

54. A fabric washing machine comprising:
a container adapted to receive fluid and fabrics to be washed in the fluid, said container being rotatably oscillatable to agitate the fluid and fabrics and being continuously rotatable in one direction for centrifugally extracting fluid from the fabrics;
a switched reluctance motor having a stator and a rotor, said rotor being rotatably oscillatable and being continuously rotatable in one direction;
drive means directly connecting said rotor to said container for rotating said container in the same direction and at substantially the same angular velocity as said rotor;
operation control means operatively connected to said motor;
said operation control means including memory means effective to store at least one set of empirically determined wash values representative of desired instantaneous rotor velocities;
said operation control means being operative to call up individual wash values in a predetermined timed sequence to provide at least one wash stroke operation of said container; and
said memory means also being effective to store a set of empirically determined spin values representative of desired instantaneous rotor velocities and said operation control means being operative to call up individual spin values in a predetermined timed sequence to provide at least one centrifugal extraction operation of said container.

55. A fabric washing as set forth in claim 54 further comprising:
means effective to vary the time lapse between successive call ups of values.

56. A fabric washing machine as set forth in claim 54, wherein:
said memory means is effective to store and said operation control means is operative to selectively call up values of at least two sets of empirically determined wash values representative of desired instantaneous rotor velocities;-and wherein each set of wash values is independent of any other set of wash values so that the wash stroke associated with a particular set of values is independent of other wash strokes, and further comprising first user operable means to select the particular set of wash values for call up by said operation control means.

57. A fabric washing machine as set forth in claim 56, further comprising second user operable means for selecting at least one spin value representative of a predetermined maximum constant rotor velocity less than the maximum rotor velocity provided in accordance with the stored set of spin values and wherein said operation control means is operative to compare the value called up from the set of spin values with the selected maximum constant rotor velocity value and to control centrifugal extraction rotation of said rotor in accordance with the compared value representative of the lower velocity.

58. A fabric washing machine as set forth in claim 56 wherein the time period between successive call ups of values in one set of values is different than the time period between successive call ups of values in another of said sets of values so that the stroke rate of said agitation means associated with one set of values is different than the stroke rate associated with another of said sets of values.

59. A fabric washing machine as set forth in claim 56, wherein each set of wash values establishes a multi-phase wash stroke of said container including at least an acceleration phase and a deceleration phase and the sequence of values corresponding to a particular acceleration phase is asymmetric relative to the sequence of values corresponding to the deceleration phase of the same set of values, so that acceleration and deceleration of said wash container in a particular oscillation are asymmetrical.

60. A fabric washing machine as set forth in claim 54, wherein:
said at least one set of wash values establishes a multi-phase wash container oscillation including an acceleration phase, a steady state velocity phase and a deceleration phase and wherein the values corresponding to each oscillation phase are independent of other oscillation phases.

61. A fabric washing machine as set forth in claim 60, further comprising user operable means for selecting at least one spin value representative of a predetermined maximum constant rotor velocity less than the maximum rotor velocity provided in accordance with the stored set of spin values and wherein said operation control means is operative to compare the value called up from the set of spin values to the selected maximum constant rotor velocity value and to control centrifugal extraction rotation of said rotor in accordance with the compared value representative of the slower velocity.

62. A fabric washing machine as set forth in claim 54, wherein:
said operation control means is effective to store at least two sets of empirically determined wash values representative of desired rotor velocities;
each set of wash values establishes a separate multi-phase oscillation of said wash container including acceleration, steady state velocity and deceleration phases;
corresponding acceleration phase values are substantially similar from set to set, corresponding deceleration phase values are substantially similar from set to set and steady state velocity phase values are substantially dissimilar from set to set;
whereby the acceleration phase and deceleration phase respectively of said wash container are substantially similar from one oscillation to another oscillation while the steady state velocity of said wash container is substantially different from one oscillation to another.

63. A fabric washing machine as set forth in claim 62, wherein:
each set of wash values establishes a multi-phase oscillation of said wash container including acceleration in the forward direction, deceleration in the forward direction, acceleration in the reverse direction and deceleration in the reverse direction; and
wherein the values corresponding to each oscillation phase are independent of the values corresponding to other oscillation phases.

64. A fabric washing machine as set forth in claim 62, further comprising user operable means for selecting at least one spin value representative of a predetermined maximum constant rotor velocity less than the maximum velocity provided in accordance with the stored set of spin values and wherein said operation control means is effective to compare the value called up from the set of spin values with the selected maximum constant rotor velocity value and to control centrifugal extraction rotation of said rotor in accordance with the compared value representative of the slower velocity.

* * * * *